(12) United States Patent
Uchida

(10) Patent No.: US 7,339,804 B2
(45) Date of Patent: Mar. 4, 2008

(54) DC-DC CONVERTER

(75) Inventor: Akihiro Uchida, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 0 days.

(21) Appl. No.: 11/549,829

(22) Filed: Oct. 16, 2006

(65) Prior Publication Data

US 2007/0086223 A1 Apr. 19, 2007

(30) Foreign Application Priority Data

Oct. 18, 2005 (JP) ............................. 2005-303510

(51) Int. Cl.
*H02H 7/122* (2006.01)
*H02M 3/335* (2006.01)
(52) U.S. Cl. .................... 363/56.1; 363/21.16
(58) Field of Classification Search ............ 363/21.01, 363/21.02, 21.04, 21.08, 21.12, 21.16, 53, 363/56.01, 56.1; 323/285; 361/87, 93.1
See application file for complete search history.

(56) References Cited

U.S. PATENT DOCUMENTS 3,805,142 A * 4/1974 Rando ........................ 363/53
5,995,387 A * 11/1999 Takahashi et al. ......... 363/21.04
6,960,906 B2 * 11/2005 Yamashita .................. 323/285
2005/0264970 A1 * 12/2005 Shinobu ..................... 361/93.1

FOREIGN PATENT DOCUMENTS

JP 2001-145344 5/2001

* cited by examiner

*Primary Examiner*—Jessica Han
(74) *Attorney, Agent, or Firm*—Oblon, Spivak, McClelland, Maier & Neustadt, P.C.

(57) ABSTRACT

A DC-DC converter of the present invention includes: an activation circuit which activates a control circuit for controlling a turning on and off of a switching element; a second rectifying and smoothing circuit which supplies an output voltage, as a power supply, to the control circuit, the output voltage being obtained by rectifying and smoothing a voltage in a tertiary winding of a transformer; an overcurrent protection circuit which limits an output current to be supplied to a load when overloaded; an overcurrent detection circuit which detects that the load is in an overcurrent state, and which outputs a detection signal during a period when the overcurrent protection circuit is operated; and an activation current switching circuit which switches outputs from the activation circuit.

4 Claims, 15 Drawing Sheets

DC-DC CONVERTER

BACKGROUND OF THE INVENTION

1. Field of the Invention

The present invention relates to a DC-DC converter, and more particularly to a technology for protecting a circuit by intermittently turning on and off a switching element when overloaded.

2. Description of the Related Art

FIG. 1 is a diagram showing a circuit configuration of a conventional flyback DC-DC converter. The DC-DC converter is operated by inputting a DC voltage obtained by rectifying and smoothing output from an AC power supply 1 by use of a full-wave rectifier 2 and a capacitor 3.

The DC-DC converter includes: an activation circuit 4; a transformer 5 having a primary winding 5-1, a secondary winding 5-2 and a tertiary winding 5-3; a switching element 6 formed of, for example, a MOSFET; a resistor 7 for detecting an input current; a control circuit 8 for controlling a turning on and off of the switching element 6; a first rectifying and smoothing circuit including a diode 11 and a capacitor 12; a second rectifying and smoothing circuit including a diode 9 and a capacitor 10; an output voltage detection circuit 24; and a photocoupler 13 including a light emitting diode 13-1 and a phototransistor 13-2. The output voltage detection circuit 24 includes resistors 17 and 16 each for detecting an output voltage, an error amplifier 14, and a reference power supply 15.

The primary winding 5-1 of the transformer 5, the switching element 6 and the resistor 7 are connected in series across the capacitor 3. The first rectifying and smoothing circuit is connected to the secondary winding 5-2 of the transformer 5, and the second rectifying and smoothing circuit is connected to the tertiary winding 5-3 of the transformer 5. The activation circuit 4 is connected between a positive terminal of the capacitor 3 and a power input terminal of the control circuit 8 (an output terminal of the second rectifying and smoothing circuit).

The resistors 17 and 16 of the output voltage detection circuit 24 are connected in series between output terminals of the first rectifying and smoothing circuit. An inverting input terminal of the error amplifier 14 is connected to a connection point between the resistors 17 and 16, and a non-inverting input terminal thereof is connected to the reference power supply 15. The light emitting diode 13-1 of the photocoupler 13 is connected to an output terminal of the error amplifier 14. A DC power supply is supplied to the control circuit 8 from the activation circuit 4 or the second rectifying and smoothing circuit. A signal from the phototransistor 13-2 of the photocoupler 13 and a signal from a connection point between the resistor 7 and the switching element 6 are inputted to the control circuit 8. Output from the control circuit 8 is sent to the switching element 6.

Next, operations of the conventional DC-DC converter thus configured will be described. First, operations in a normal state will be described. When the switching element 6 is turned on, energy is stored in the primary winding 5-1 of the transformer 5. When the switching element 6 is turned off, flyback energy of the transformer 5 is transmitted to the secondary winding 5-2. A voltage generated in the secondary winding 5-2 is rectified and smoothed by the first rectifying and smoothing circuit including the diode 11 and the capacitor 12, which are connected to the secondary winding 5-2. Accordingly, DC power is supplied to a load 18.

A DC voltage outputted from the first rectifying and smoothing circuit (a voltage between both ends of the capacitor 12) is divided by the resistors 16 and 17, and is supplied to the inverting input terminal of the error amplifier 14. The error amplifier 14 compares the voltage inputted to the inverting input terminal with a voltage of the reference power supply 15, and outputs an error voltage. Thus, a current flows into the light emitting diode 13-1 of the photocoupler and the light emitting diode 13-1 emits light. The emitted light is transmitted to the phototransistor 13-2, and the phototransistor 13-2 converts the emitted light into an error signal, and sends the signal to the control circuit 8. The control circuit 8 controls the turning on and off of the switching element 6 by generating a PWM signal whose pulse width is adjusted according to the error signal from the phototransistor 13-2 and by sending the signal to a gate of the switching element 6.

In this respect, in a case where the voltage inputted to the inverting input terminal of the error amplifier 14 is larger than a reference voltage outputted from the reference power supply 15, the output from the error amplifier 14 is lowered and the current flowing into the photocoupler 13 is increased. Accordingly, the control circuit 8 generates a PWM signal such as to shorten a time period during which the switching element 6 is being turned on, and sends the signal to the switching element 6. Consequently, an output voltage is lowered, and this is regulated to be a predetermined stabilized voltage.

Next, how the control circuit 8 operates when activated will be described. First, the capacitor 10 is charged through the activation circuit 4 from the capacitor 3. Accordingly, when the voltage of the capacitor 10 is increased to reach an activating voltage Vs that is a voltage at which the control circuit 8 can be operated, the control circuit 8 sends the PWM signal to the switching element 6. Accordingly, the turning on and off of the switching element 6 is started, and a DC voltage is supplied to the load 18 through the first rectifying and smoothing circuit from the secondary winding 5-2. At the same time, a voltage is also generated in the tertiary winding 5-3 of the transformer 5. The generated voltage is rectified and smoothed by the second rectifying and smoothing circuit including the diode 9 and the capacitor 10, and thus the voltage is converted into a DC voltage. The DC voltage is supplied to the control circuit 8 as a power supply for the control circuit 8.

Next, how operations are performed when overloaded will be described. In the above-described state, when lowered impedance of the load 18 increases an output current, a current flowing into the switching element 6 is also increased. The current flowing into the switching element 6 is converted into a voltage by the resistor 7, and the converted voltage is sent to the control circuit 8. The control circuit 8 turns off the switching element 6 when the voltage generated by the resistor 7 gets larger than a predetermined value. Accordingly, since the energy stored in the primary winding 5-1 of the transformer 5 is limited, the flyback energy transmitted to the secondary winding 5-2 is limited. Accordingly, an increase in output power is suppressed, an output voltage is lowered, and overloading is prevented.

However, in a configuration for suppressing an overcurrent flowing into the load 18 by detecting the current flowing into the switching element 6, when the output voltage is lowered, the output current is increased. In particular, when the load 18 is short-circuited or the like, the output current is increased, which may damage the diode 11 and the like. Accordingly, a current limiting circuit may be used, which directly detects the output current and limits the output current so as to set the detected current to be less than a predetermined value.

FIG. 2 is a diagram showing a circuit at a secondary side of another conventional DC-DC converter. In the DC-DC converter shown in FIG. 2, an overcurrent detection circuit 25 is added to the secondary side of the circuit of the DC-DC converter shown in FIG. 1. The overcurrent detection circuit 25 includes a resistor 23, which is interposed between the load 18 and the first rectifying and smoothing circuit, an error amplifier 21, and a reference power supply 22. An inverting input terminal of the error amplifier 21 is connected to a connection point between the resistor 23 and the load 18, and a non-inverting input terminal thereof is connected to the reference power supply 22. Output from the error amplifier 21 is connected to the light emitting diode 13-1 through a diode 20. In order to avoid collision between the output from the error amplifier 21 and the output from the error amplifier 14, a diode 19 is interposed between the error amplifier 14 and the light emitting diode 13-1.

In the conventional DC-DC converter thus configured, a voltage generated by an output current flowing into the resistor 23 is applied to the inverting input terminal of the error amplifier 21. The error amplifier 21 compares the voltage inputted to the inverting input terminal with a reference voltage from the reference power supply 22, which is inputted to the non-inverting input terminal, and increases a current flowing into the light emitting diode 13-1 when the voltage inputted to the inverting input terminal exceeds the reference voltage from the reference power supply 22. The control circuit 8 generates a PWM signal such as to shorten a time period during which the switching element 6 is turned on, according to a signal from the phototransistor 13-2, and sends the signal to the switching element 6. Thus, the output current is limited to a constant current, and the output voltage is lowered. At the same time, a voltage generated in the tertiary winding 5-3 is also lowered, and a power supply voltage supplied to the control circuit 8 is lowered.

When the power supply voltage supplied to the control circuit 8 is lowered to a stop voltage Vu that stops the operations of the control circuit 8, the control circuit 8 stops its operations, and the turning on and off of the switching element 6 stops. When the above state is set, the capacitor 10 is charged by the activation circuit 4 and its voltage increases. A current outputted from the activation circuit 4 is set smaller than a current consumed when the control circuit 8 is operated. On account of this, when the control circuit 8 is operated, the activation circuit 4 cannot charge the capacitor 10 to increase the voltage. However, when the control circuit 8 is stopped, the current consumption is very small. Thus, the activation circuit 4 can charge the capacitor 10 and increase its voltage.

When the voltage of the capacitor 10 is increased to a activating voltage Vs of the control circuit 8, the control circuit 8 restarts its operations, and the switching element 6 is started to be turned on and off. In this event, when the impedance of the load 18 is still low, a large output current flows and the overcurrent detection circuit 25 is operated again to lower an output voltage. When the voltage of the capacitor 10 is lowered to the stop voltage Vu of the control circuit 8, the operations of the control circuit 8 are stopped again.

By repeating the operations described above, the switching element 6 is intermittently turned on and off. According to the configuration described above, the switching element 6 is intermittently turned on and off when the overload state is set. Thus, even if the load 18 is short-circuited or the like, an excessive output current does not flow and components are not damaged. When the impedance of the load 18 is increased and the overload state is ended, the overcurrent detection circuit 25 does not operate even if the turning on and off of the switching element 6 is started. Thus, neither the output voltage nor the power supply voltage of the control circuit 8 is lowered. Consequently, a stable voltage can be supplied to the load 18.

However, in the conventional DC-DC converter shown in FIG. 2 described above, when the current consumed by the control circuit 8 is small, the decreasing speed of the voltage of the capacitor 10 becomes slow. On account of this, the switching operation cannot be immediately stopped, which may cause a flow of an excessive output current. In order to solve this problem, a DC-DC converter disclosed in Japanese Patent Laid-Open Official Gazette No. 2001-145344 surely stops the switching operation, when an overcurrent protection function is operated and the power supply voltage of the control circuit 8 is lowered, by detecting that the power supply voltage reaches a predetermined voltage and forcibly lowering the power supply voltage of the control circuit 8.

FIG. 3 is a circuit configuration diagram of the DC-DC converter disclosed in Japanese Patent Laid-Open Official Gazette No. 2001-145344. The DC-DC converter is formed by adding a pseudo-impedance circuit 26 to the DC-DC converter shown in FIG. 1. The pseudo-impedance circuit 26 is connected between output terminals of the second rectifying and smoothing circuit. The pseudo-impedance circuit 26 includes a backflow prevention diode 51, a Zener diode 52, two resistors 53 and 54, two NPN transistors 55 and 56, and a dummy resistor 57.

In the above configuration, when the impedance of the load 18 is significantly lowered, a DC output voltage supplied to the load 18 from the first rectifying and smoothing circuit is lowered, and a voltage generated in the tertiary winding 5-3 of the transformer 5 is also lowered. Moreover, a power supply voltage supplied to the control circuit 8 through the second rectifying and smoothing circuit from the tertiary winding 5-3 of the transformer 5 is also lowered. When the power supply voltage of the control circuit 8, which is outputted through the second rectifying and smoothing circuit from the tertiary winding 5-3 of the transformer 5, in other words, a rectified voltage obtained through the backflow prevention diode 51 from the tertiary winding 5-3 of the transformer 5, is lowered below a voltage in a normal operation, the Zener diode 52 is set in a non-conducting state. On account of this, the transistor 55 is turned off, and the transistor 56 is turned on. Accordingly, since charge stored in the capacitor 10 is immediately released through the resistor 57 and the transistor 56, the power supply voltage of the control circuit 8 rapidly drops to the stop voltage Vu of the control circuit 8. Accordingly, the operations of the control circuit 8 are stopped, and the DC output voltage comes substantially to 0V. Consequently, the DC-DC converter is stopped.

According to the DC-DC converter described above, when the impedance of the load 18 is significantly lowered, the power supply voltage of the control circuit 8, which is outputted from the second rectifying and smoothing circuit, rapidly drops to the stop voltage Vu of the control circuit 8 by the pseudo-impedance circuit 26. Therefore, even if power consumption of the control circuit 8 is small, the switching operation can be surely stopped. Thus, it is possible to prevent the flow of the excessive output current.

According to the conventional DC-DC converter described above, an overcurrent protection circuit is operated when overloaded, and lowering of the output voltage is detected. Accordingly, the switching element is intermittently turned on and off. Thus, it is possible to prevent the flow of overcurrent when the load is short-circuited and also to reduce the power consumption. In order to reduce the power consumption, it is preferable that an intermittent period of intermittently turning on and off the switching element is set longer.

However, the intermittent period is determined by the current outputted from the activation circuit 4 and the capacity of the capacitor 10. Accordingly, in a case where the output current of the load at the time when the load is short-circuited is reduced by extending the intermittent period, an activating time period for activating the control circuit 8 is also extended. This causes a problem that it may be impossible to satisfy a regulation on the activating time period, which is provided for specifications of the DC-DC converter.

SUMMARY OF THE INVENTION

It is an object of the present invention to provide a DC-DC converter capable of reducing power consumption when overloaded without affecting activating time.

A DC-DC converter of the present invention includes: a switching element connected to a DC power supply through a primary winding of a transformer; a control circuit which controls a turning on and off of the switching element; an activation circuit which activates the control circuit by supplying a power supply voltage to the control circuit; a first rectifying and smoothing circuit which supplies a first output voltage to a load, the first output voltage being obtained by rectifying and smoothing a voltage generated in a secondary winding of the transformer; a second rectifying and smoothing circuit which supplies a second output voltage, as a power supply, to the control circuit, the second output voltage being obtained by rectifying and smoothing a voltage generated in a tertiary winding of the transformer; an overcurrent protection circuit which limits an output current to be supplied to the load when overloaded; an overcurrent detection circuit which detects that the load is in an overcurrent state during a period when the overcurrent protection circuit is operated, and outputs a detection signal; and an activation current switching circuit which switches outputs from the activation circuit so as to output a first activation current generated from the DC power supply when the control circuit is being activated and to output a second activation current, which is smaller than the first activation current, during a period when the detection signal is outputted from the overcurrent detection circuit after the control circuit is activated. The control circuit controls the output current in the overload state by intermittently turning on and off the switching element in a case where the second output voltage from the second rectifying and smoothing circuit is lowered by an operation of the overcurrent protection circuit. Moreover, the activation circuit supplies to the control circuit a voltage obtained by charging any of the first and second activation currents, which is switched by the activation current switching circuit, as the power supply voltage.

According to the present invention, at the time of activation, the control circuit is activated by the first activation current of the activation circuit. Moreover, when the switching element is intermittently turned on and off when overloaded after the activation, the control circuit is activated by the second activation current which is smaller than the first activation current. Therefore, an initial activating time and an intermittent period when overloaded can be separately set. Thus, it is possible to extend the intermittent period when overloaded without affecting the activating time period, and to reduce power consumption when overloaded.

DESCRIPTION OF THE EMBODIMENTS

With reference to the drawings, embodiments of a DC-DC converter according to the present invention will be described in detail below.

Embodiment 1

Figure 1:
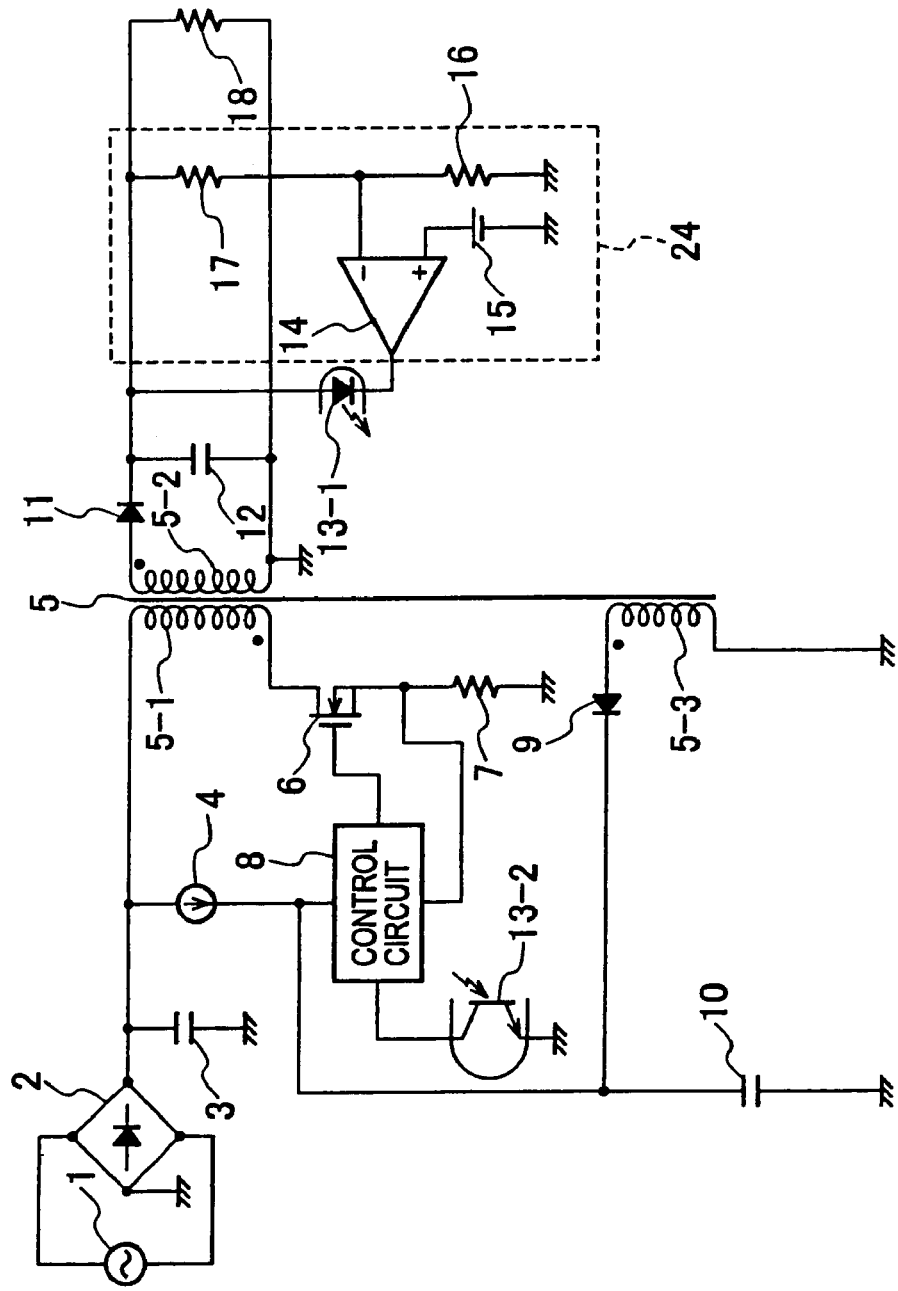
FIG. 1 is a circuit configuration diagram of a conventional flyback DC-DC converter.
Figure 2:
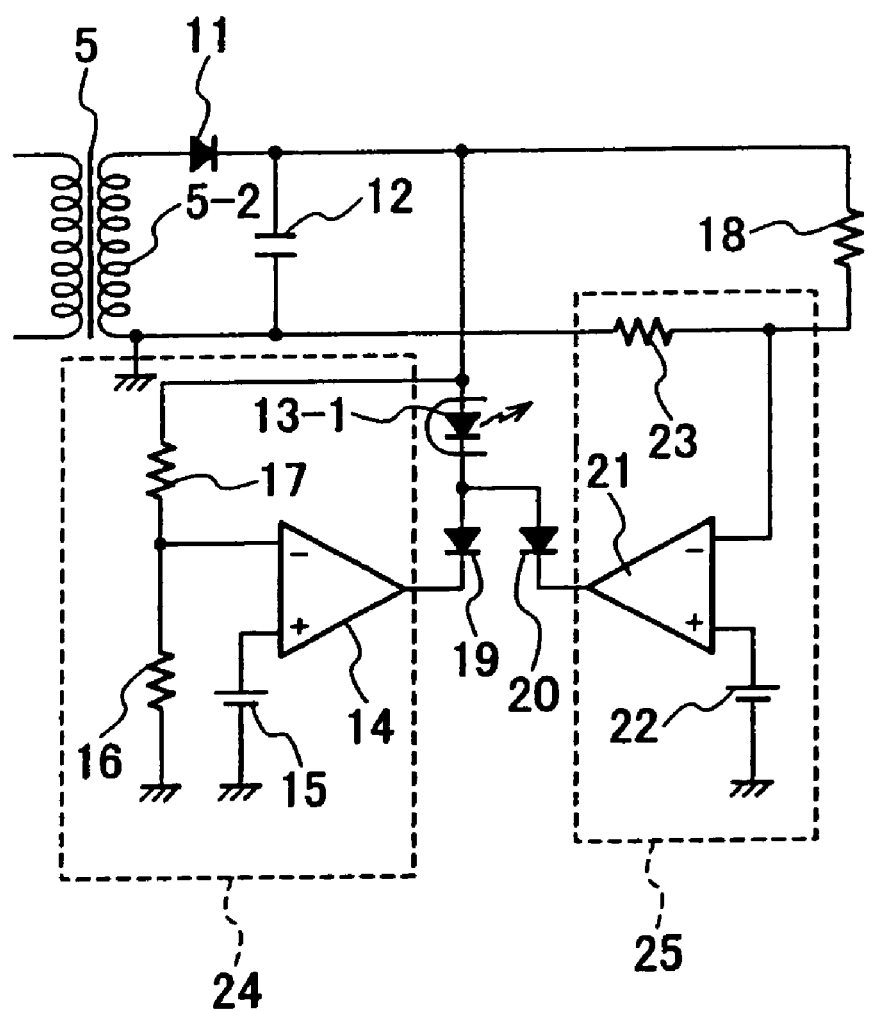
FIG. 2 is a diagram showing a circuit at the secondary side of another conventional DC-DC converter.
Figure 3:
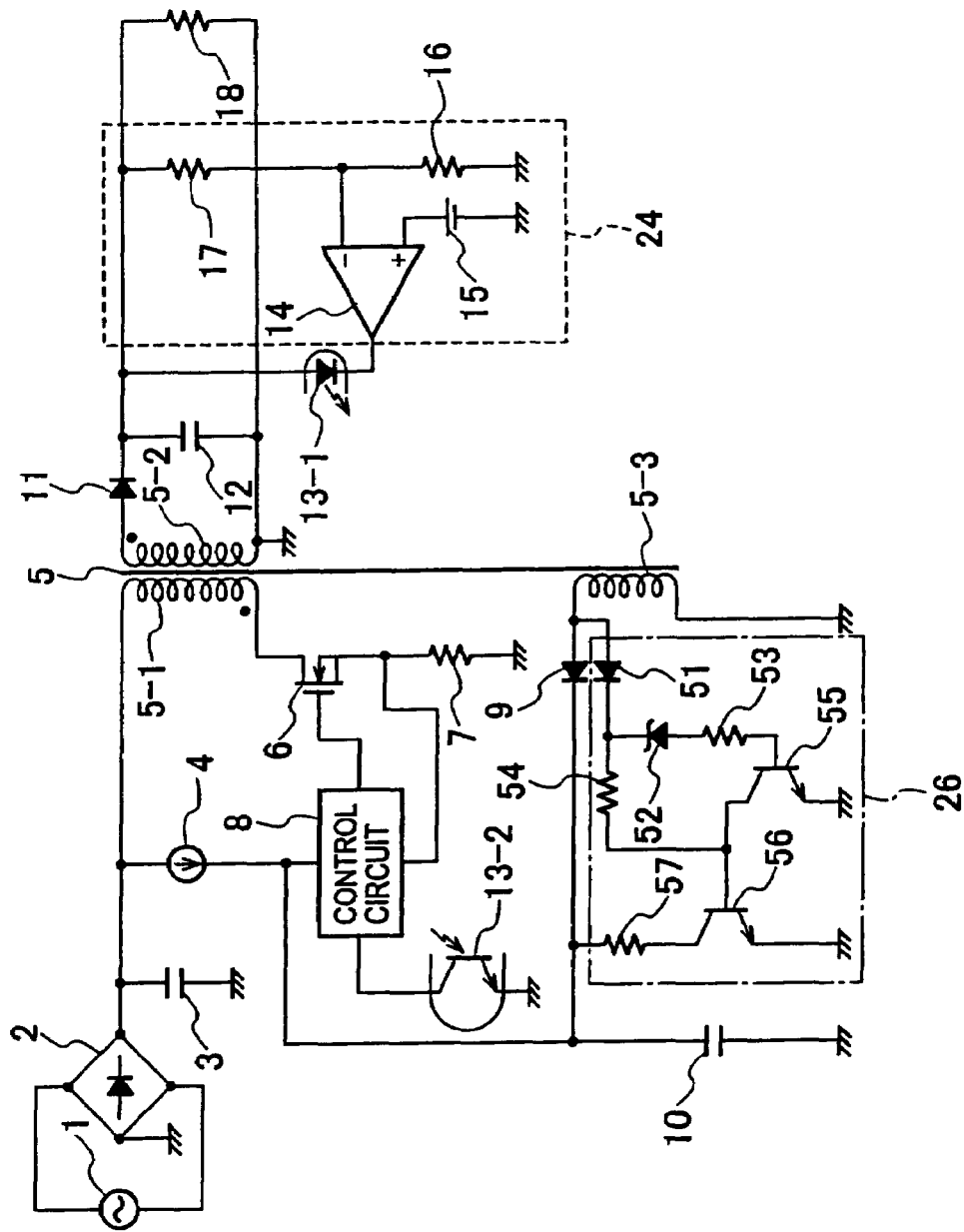
FIG. 3 is a circuit configuration diagram of still another conventional DC-DC converter.
Figure 4:
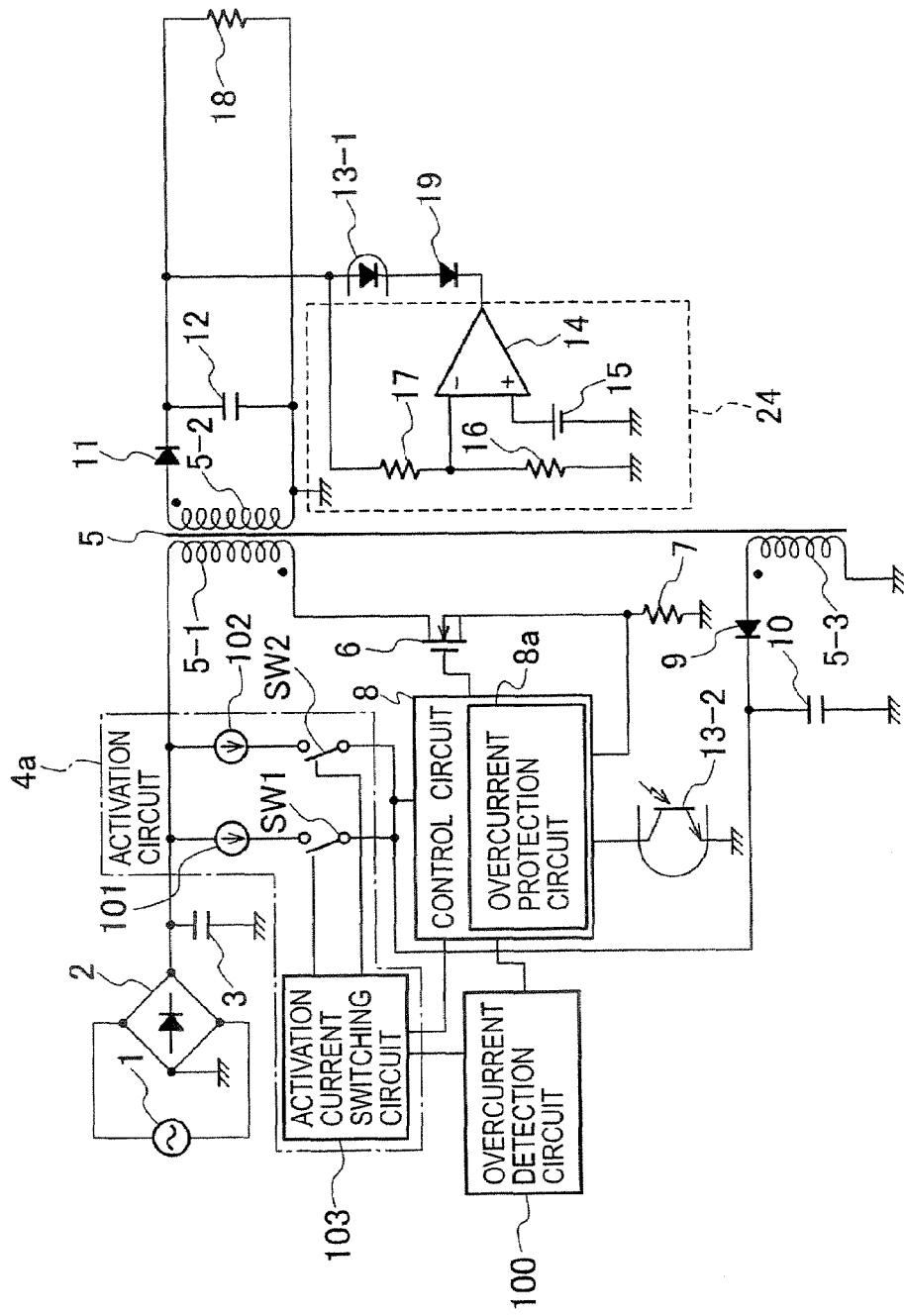
FIG. 4 is a circuit configuration diagram of a DC-DC converter according to embodiment 1 of the present invention.

FIG. 4 is a circuit configuration diagram of a DC-DC converter according to embodiment 1 of the present invention. The DC-DC converter is a flyback DC-DC converter, which is operated by inputting a DC voltage obtained by rectifying and smoothing output from an AC power supply 1 by use of a full-wave rectifier 2 and a capacitor 3.

The DC-DC converter includes: an activation circuit 4a; a transformer 5 having a primary winding 5-1, a secondary winding 5-2 and a tertiary winding 5-3; a switching element 6 formed of, for example, a MOSFET; a resistor 7 for detecting an input current; a control circuit 8 for controlling the turning on and off of the switching element 6; a first rectifying and smoothing circuit including a diode 11 and a capacitor 12; a second rectifying and smoothing circuit including a diode 9 and a capacitor 10; an output voltage detection circuit 24; a photocoupler 13 including a light emitting diode 13-1 and a phototransistor 13-2; and an overcurrent detection circuit 100. The output voltage detection circuit 24 includes resistors 17 and 16 for detecting an output voltage, an error amplifier 14, and a reference power supply 15.

Between of the capacitor 3, the primary winding 5-1 of the transformer 5, the switching element 6 and the resistor 7 are connected in series. The first rectifying and smoothing circuit is connected to the secondary winding 5-2 of the transformer 5, and the second rectifying and smoothing circuit is connected to the tertiary winding 5-3 of the transformer 5. The activation circuit 4a is connected between a positive terminal of the capacitor 3 and a power input terminal of the control circuit 8 (an output terminal of the second rectifying and smoothing circuit).

The resistors 17 and 16 of the output voltage detection circuit 24 are connected in series between output terminals of the first rectifying and smoothing circuit. An inverting input terminal of the error amplifier 14 is connected to a connection point between the resistors 17 and 16, and a non-inverting input terminal thereof is connected to the reference power supply 15. The light emitting diode 13-1 of the photocoupler 13 is connected to an output terminal of the error amplifier 14 through a diode 19. A DC voltage is supplied to the control circuit 8 from the activation circuit 4a or the second rectifying and smoothing circuit. A signal from the phototransistor 13-2 of the photocoupler 13 and output from a connection point between the resistor 7 and the switching element 6 are inputted to the control circuit 8. Moreover, output from the control circuit 8 is sent to the switching element 6.

The activation circuit 4a includes a first constant current circuit 101, a second constant current circuit 102, a first switch SW1, a second switch SW2 and an activation current switching circuit 103. The first constant current circuit 101 generates a large current based on a DC input power. The second constant current circuit 102 generates a small current based on the DC input power. The sum of currents, each of which is generated by the first constant current circuit 101 and by the second constant current circuit 102, is called a first activating current. Moreover, the current generated by the second constant current circuit 102 is called a second activating current.

The first switch SW1 is opened and closed according to a control signal from the activation current switching circuit 103, and controls whether or not to send the current generated by the first constant current circuit 101 to the capacitor 10. The second switch SW2 is opened and closed according to the control signal from the activation current switching circuit 103, and controls whether or not to send the current generated by the second constant current circuit 102 to the capacitor 10.

The activating current switching circuit 103 controls opening and closing of the first and second switches SW1 and SW2. To be more specific, at the time of activation, the activation current switching circuit 103 turns on the first and second switches SW1 and SW2. When the control circuit 8 is detected to activate its operations, the activation current switching circuit 103 turns off the first and second switches SW1 and SW2. When the control circuit 8 starts its operations, a power supply voltage of the control circuit 8 is supplied from the second rectifying and smoothing circuit which includes the diode 9, connected to the tertiary winding 5-3, and the capacitor 10. Thus, a current from the activation circuit 4a becomes unnecessary. Therefore, efficiency can be increased by turning off the first and second switches SW1 and SW2. Moreover, upon receipt of a signal indicating detection of an overcurrent from the overcurrent detection circuit 100, the activation current switching circuit 103 turns on the second switch SW2.

The control circuit 8 includes an overcurrent protection circuit 8a. The overcurrent protection circuit 8a is operated in a case where a voltage value is not less than a predetermined value. Specifically, the voltage value is obtained by converting a current flowing toward the resistor 7 through the switching element 6 from the primary winding 5-1 of the transformer 5 into a voltage. Moreover, the overcurrent protection circuit 8a sends the overcurrent detection circuit 100 a signal indicating that the overcurrent protection circuit 8a is in operation.

When the signal sent from the overcurrent protection circuit 8a in the control circuit 8 indicates that the overcurrent protection circuit 8a is in operation, the overcurrent detection circuit 100 generates a detection signal indicating that an overcurrent state is detected, and sends the detection signal to the activation current switching circuit 103.

Next, with reference to a waveform diagram shown in FIG. 5, description will be given of operations of the DC-DC converter thus configured according to embodiment 1 of the present invention.

Figure 5:
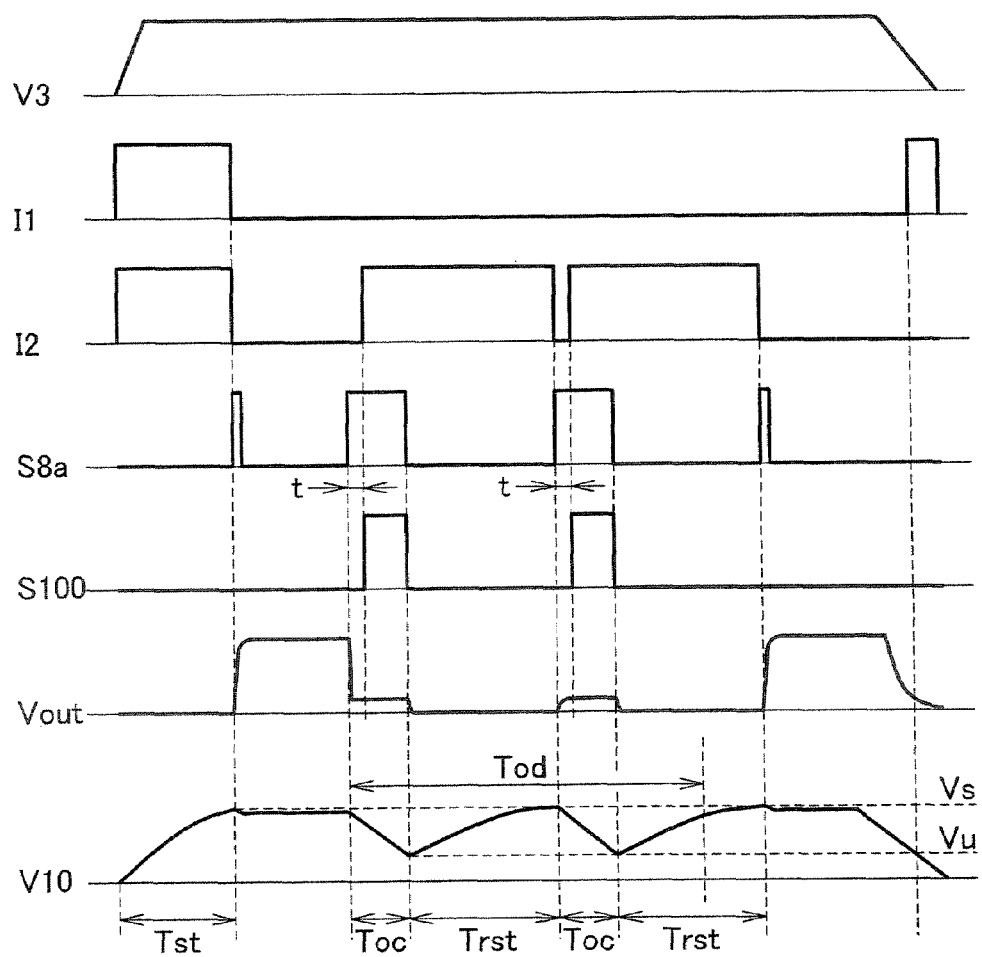
FIG. 5 is a waveform diagram showing operations of the DC-DC converter according to embodiment 1 of the present invention.

First, as shown in FIG. 5, in an activating period Tst of the control circuit 8, a voltage obtained by rectifying the output from the AC power supply 1 by use of the full-wave rectifier 2 is applied to the capacitor 3. Thus, the capacitor 3 is charged, and a DC input voltage that is a voltage V3 of the capacitor 3 is set to a predetermined value. In this event, the activation current switching circuit 103 turns on the first and second switches SW1 and SW2. Therefore, as shown in FIG. 5, activation currents are outputted from the first and second constant current circuits 101 and 102. In this case, the sum of a current I1 from the first constant current circuit 101 and a current I2 from the second constant current circuit 102 is set to be a first activation current. Thus, as shown in FIG. 5, the capacitor 10 is gradually charged, and a voltage V10 at both ends of the capacitor 10 is increased.

When the voltage of the capacitor 10 reaches an activating voltage Vs of the control circuit 8, the control circuit 8 sends a PWM signal to the switching element 6. Accordingly, the turning on and off of the switching element 6 is started. When the turning on and off of the switching element 6 is started, a voltage is generated in the secondary winding 5-2, and the generated voltage is rectified and smoothed by the first rectifying and smoothing circuit including the diode 11 and the capacitor 12. Thus, a DC output voltage Vout as shown in FIG. 5 is supplied to a load 18. At the same time, a voltage is generated in the tertiary winding 5-3, and the generated voltage is rectified and smoothed by the second rectifying and smoothing circuit including the diode 9 and the capacitor 10. As shown in FIG. 5, the voltage V10 of the capacitor 10 is slightly lowered until the voltage of the tertiary winding 5-3 rises. Thereafter, when the capacitor 10 is charged by the voltage of the tertiary winding 5-3, the voltage V10 of the capacitor 10 becomes a power supply voltage sufficiently large to operate the control circuit 8.

In the state as described above, when the load is increased or short-circuited, the output current is increased and, as shown in FIG. 5, a period of operations of the DC-DC converter is set to an overcurrent period Toc within an overload period Tod. In this event, the overcurrent protection circuit 8a included in the control circuit 8 is operated. When the overcurrent protection circuit 8a is operated, as shown in FIG. 5, a signal S8a indicating to that effect is sent to the overcurrent detection circuit 100. Upon detection of the overcurrent state based on the signal S8a from the overcurrent protection circuit 8a, the overcurrent detection circuit 100 generates a detection signal S100 and sends the signal to the activation current switching circuit 103, as shown in FIG. 5. In response to the detection signal S100 sent from the overcurrent detection circuit 100, the activation current switching circuit 103 turns on the second switch SW2. Moreover, when the overcurrent protection circuit 8a is operated, the output voltage is lowered and the voltage generated in the tertiary winding 5-3 is also lowered. Moreover, as shown in FIG. 5, the voltage V10 of the capacitor 10 is also lowered. When the voltage V10 of the capacitor 10 is lowered to a stop voltage Vu of the control circuit 8, the operation of the control circuit 8 is stopped. As a result, the turning on and off of the switching element 6 is stopped.

In the activation circuit 4a, the first switch SW1 is off and the second switch SW2 is on. Accordingly, the second activation current I2 outputted from the second constant current circuit 102 flows into the capacitor 10 through the second switch SW2, and charges the capacitor 10 as shown in FIG. 5. The second activation current I2 outputted from the second constant current circuit 102 is set smaller than a current consumed when the control circuit 8 is operated. Accordingly, when the control circuit 8 is operated, the capacitor 10 cannot be charged to increase the voltage. However, when the control circuit 8 is stopped, the current to be consumed becomes extremely small. Thus, the capacitor 10 is charged by the activation circuit 4a, and the voltage V10 thereof is increased in a reactivation period Trst in the overcurrent state.

When the voltage V10 of the capacitor 10 is increased and comes to the activating voltage Vs of the control circuit 8, the control circuit 8 starts its operation, and the turning on and off of the switching element 6 is started. Upon detection of the operation of the control circuit 8, the activation current switching circuit 103 turns off the second switch SW2. In this event, when the state where the load is large or short-circuited is not yet resolved, in other words, in a case where a period of operations of the DC-DC converter is the overcurrent period Toc, the overcurrent protection circuit 8a is operated again and the overcurrent detection circuit 100 outputs the detection signal S100. Thus, the activation current switching circuit 103 turns on the second switch SW2. When the overcurrent protection circuit 8a is operated, the output voltage and the voltage generated in the tertiary winding 5-3 are lowered, and the operation of the control circuit 8 is stopped again. Thereafter, the activation circuit 4a recharges the capacitor 10 by use of the second constant current circuit 102.

In a period when the overload state continues, the operations described above are repeated, and the switching element 6 is intermittently turned on and off. When the load is reduced or short-circuiting thereof is resolved, the output voltage is stabilized at a predetermined voltage at the point where the turning on and off of the switching element 6 is restarted, and the overcurrent protection circuit 8a is not operated. Accordingly, the voltage generated in the tertiary winding 5-3 is not lowered, and the control circuit 8 continues the operation of turning on and off the switching element 6.

Note that, when the control circuit 8 starts its operation and the output voltage rises, there is a case where the overcurrent protection circuit 8a operates. In such a case, as shown in FIG. 5, the overcurrent detection circuit 100 can be configured to delay output from the detection signal S100 until the output voltage Vout rises after the overcurrent protection circuit 8 starts operating.

As described above, in the DC-DC converter according to embodiment 1 of the present invention, when the DC-DC converter is activated by application of the DC input voltage, the activation circuit 4a charges the capacitor 10 by use of the large first activation current obtained by adding the output current of the first constant current circuit 101 and the output current of the second constant current circuit 102. When the overcurrent protection circuit 8a is operated and the control circuit 8 is stopped, the capacitor 10 is charged by the small second activation current that is only the output current of the second constant current circuit 102.

Figure 6:
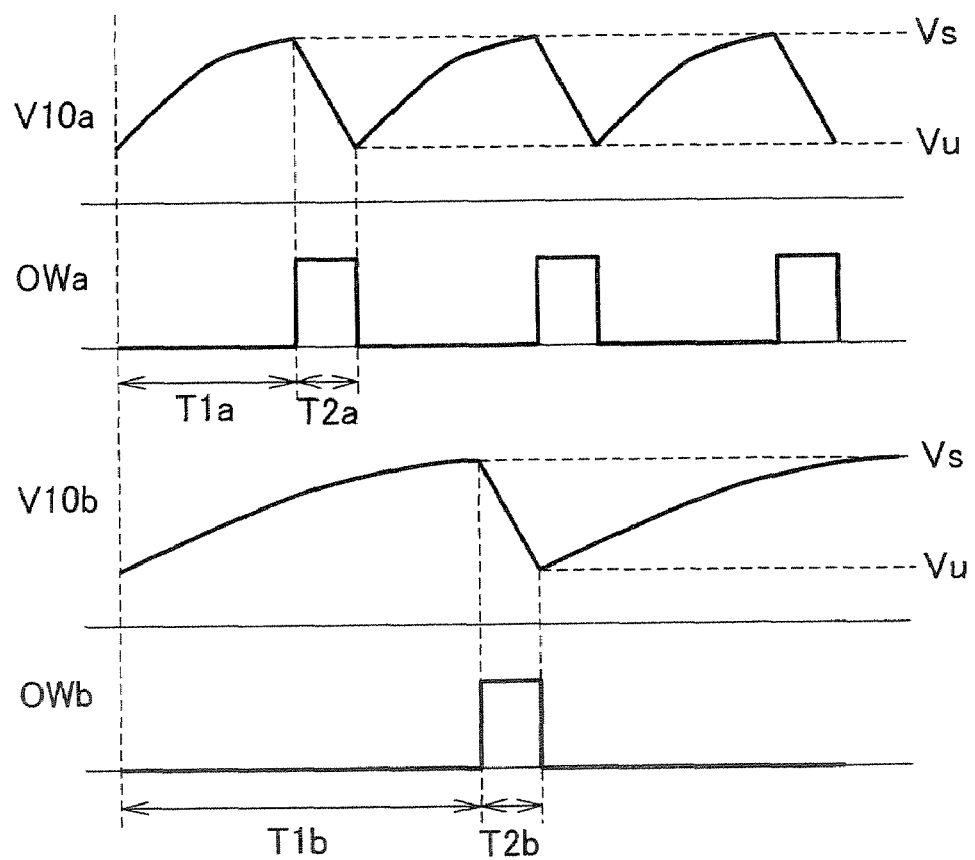
FIG. 6 is a waveform diagram for explaining characteristics of the operations of the DC-DC converter according to embodiment 1 of the present invention by comparing to those of the conventional DC-DC converter.

Therefore, in the conventional DC-DC converter, in the state where the load is large or short-circuited, as shown in FIG. 6, the charging and the discharging of the capacitor 10 are repeated by a short intermittent period (T1a+T2a). Specifically, FIG. 6 shows a voltage V10a of the capacitor and output power OWa.

On the other hand, in the DC-DC converter according to embodiment 1, at the time of activation, the capacitor 10 is charged within a short period (T1a+T2a) as in the conventional converter. Thus, it does not affect activating time. Moreover, when the overcurrent protection circuit 8a is operated, as shown in FIG. 6, the charging and the discharging of the capacitor 10 are repeated by a long intermittent period (T1b+T2b). Specifically, FIG. 6 shows a voltage V10b of the capacitor and output power OWb. Thus, in the conventional DC-DC converter, as indicated by the output power OWa in FIG. 6, a frequency of outputting the DC voltage per unit time is increased, and the output power (average value) is increased. On the other hand, in the DC-DC converter according to embodiment 1, as indicated by the output power OWb in FIG. 6, the frequency of outputting the DC voltage per unit time is reduced, and the output power (average value) is reduced. Thus, power consumption can be reduced.

Note that, in the above-described DC-DC converter according to embodiment 1, the overcurrent detection circuit 100 is configured so as to detect the presence or absence of overcurrent based on whether or not the overcurrent protection circuit 8a for monitoring the current of the switching element 6 is operated. The overcurrent detection circuit 100 may be configured to detect the presence or absence of overcurrent by monitoring the voltage of the phototransistor 13-2 of the photocoupler 13, and doing the like. Since the current of the switching element 6 is normally monitored by the overcurrent protection circuit 8a, the presence or absence of overcurrent can be detected by use of the same method. When the overcurrent protection circuit 8a is operated, the output voltage is lowered. Accordingly, the output voltage detection circuit 24 tries to increase the voltage. However, since the overcurrent protection circuit 8a suppresses an increase in the voltage, the current flowing into the light emitting diode 13-1 of the photocoupler 13 is minimized. Accordingly, the current flowing into the light emitting diode 13-2 of the photocoupler is maximized. By detecting the condition described above, it may be determined that the overcurrent protection is executed.

Embodiment 2

As is clear from the waveform of the voltage V10 of the capacitor 10 in FIG. 5, the equivalent operations as those in embodiment 1 described above can be performed by monitoring the voltage V10 of the capacitor 10. A DC-DC converter according to embodiment 2 controls an intermittent period according to the voltage V10 of the capacitor 10.

Figure 7:
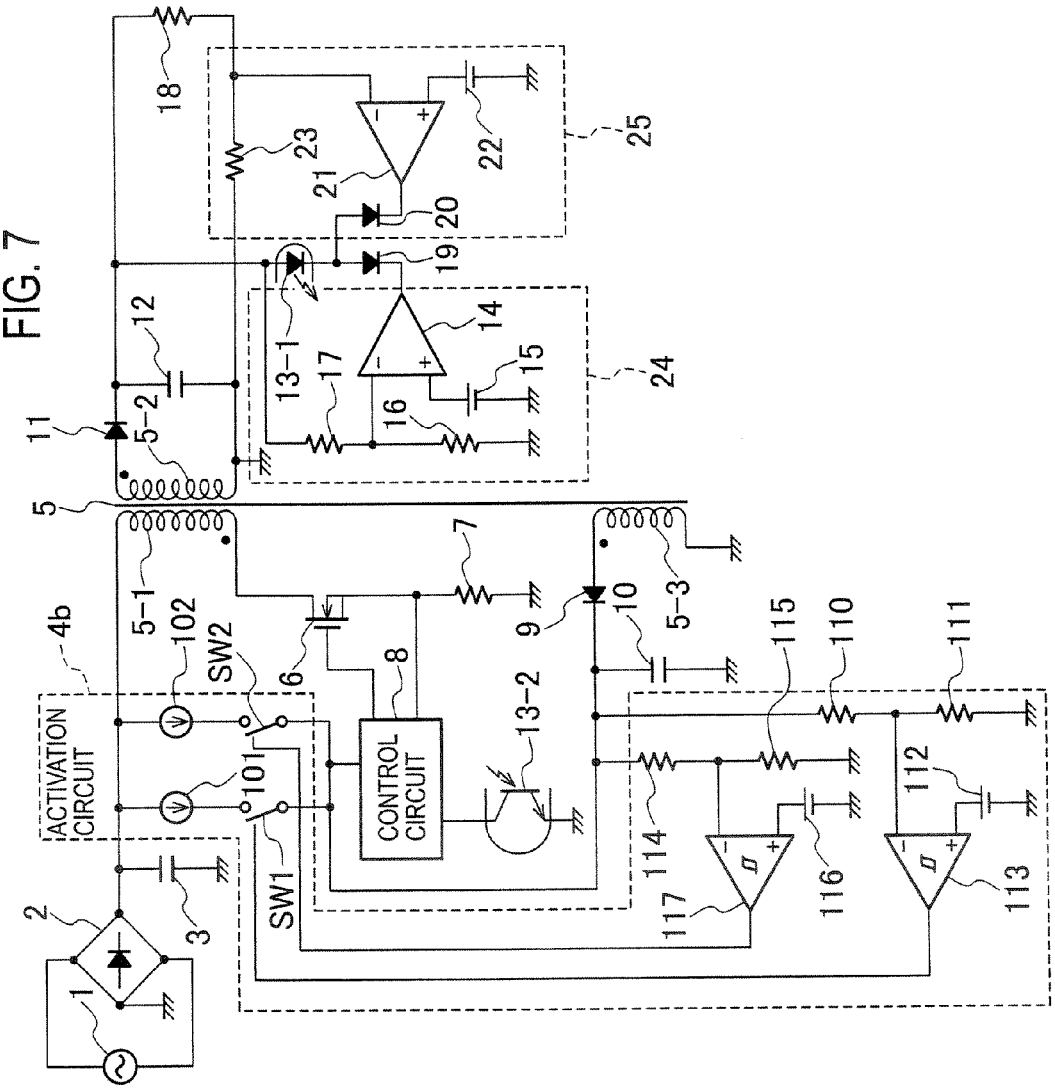
FIG. 7 is a circuit configuration diagram of a DC-DC converter according to embodiment 2 of the present invention.

FIG. 7 is a circuit configuration diagram of the DC-DC converter according to embodiment 2 of the present invention. The DC-DC converter is configured by changing the activation circuit 4a in the DC-DC converter of embodiment 1 to an activation circuit 4b and by adding an overcurrent detection circuit 25. In the following description, differences from embodiment 1 will be mainly described.

The activation circuit 4b includes a first constant current circuit 101, a second constant current circuit 102, a first switch SW1, a second switch SW2, resistors 110 and 111, a reference power supply 112, a hysteresis comparator 113, resistors 114 and 115, a reference power supply 116 and a hysteresis comparator 117.

The resistors 110 and 111 are connected in series between both ends of a capacitor 10. A connection point between the resistors 110 and 111 is connected to an inverting input terminal of the hysteresis comparator 113. A voltage of the reference power supply 112 is supplied to a non-inverting input terminal of the hysteresis comparator 113. An output terminal of the hysteresis comparator 113 is connected to the first switch SW1 to control opening and closing of the first switch SW1.

The resistors 114 and 115 are connected in series between both ends of the capacitor 10. A connection point between the resistors 114 and 115 is connected to an inverting input terminal of the hysteresis comparator 117. A voltage of the reference power supply 116 is supplied to a non-inverting input terminal of the hysteresis comparator 117. An output terminal of the hysteresis comparator 117 is connected to the second switch SW2 to control opening and closing of the second switch SW2.

The overcurrent detection circuit 25 includes a resistor 23, which is interposed between the load 18 and the first rectifying and smoothing circuit, an error amplifier 21, a reference power supply 22, and a diode 20. An inverting input terminal of the error amplifier 21 is connected to a connection point between the resistor 23 and the load 18, and a non-inverting input terminal thereof is connected to the reference power supply 22. Output from the error amplifier 21 is connected to the light emitting diode 13-1 of the photocoupler through the diode 20. Note that, in order to avoid collision between the output from the error amplifier 21 and the output from the error amplifier 14 included in the output voltage detection circuit 24, a diode 19 is interposed between the error amplifier 14 and the light emitting diode 13-1.

Next, with reference to a waveform diagram shown in FIG. 8, description will be given of operations of the DC-DC converter thus configured according to embodiment 2 of the present invention.

Figure 8:
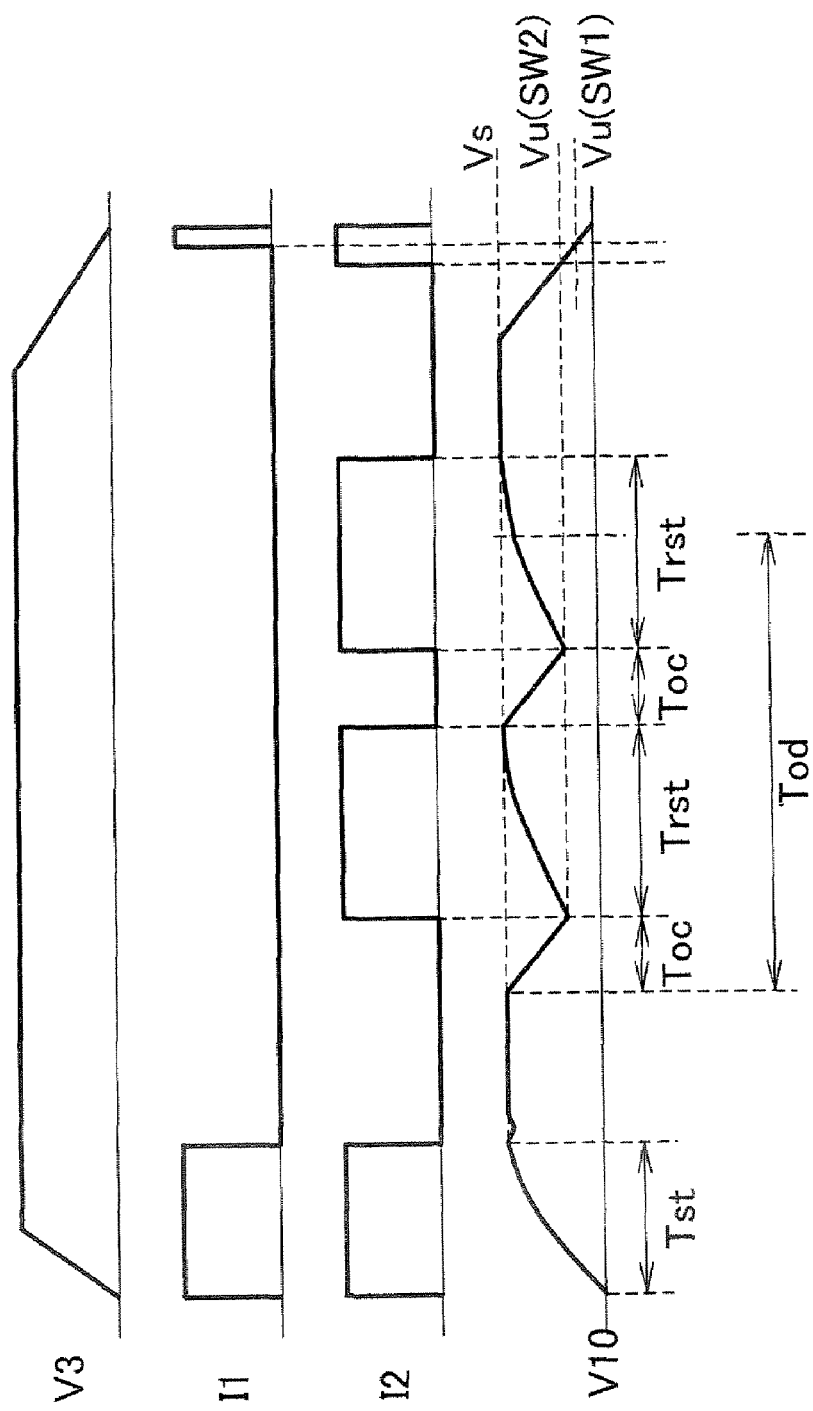
FIG. 8 is a waveform diagram showing operations of the DC-DC converter according to embodiment 2 of the present invention.

First, as shown in FIG. 8, in an activating period Tst of the control circuit 8, a voltage obtained by rectifying the output from the AC power supply 1 by use of the full-wave rectifier 2 is applied to the capacitor 3. Thus, the capacitor 3 is charged, and a DC input voltage that is a voltage V3 of the capacitor 3 is set to a predetermined value.

At this point, since a voltage V10 of the capacitor 10 is low, both of the hysteresis comparators 113 and 117 output H-level signals, and turn on the first and second switches SW1 and SW2. Therefore, as shown in FIG. 8, activation currents are outputted from the first and second constant current circuits 101 and 102. In this case, the sum of a current I1 from the first constant current circuit 101 and a current I2 from the second constant current circuit 102 is set to be the activation current. Thus, as shown in FIG. 8, the capacitor 10 is gradually charged, and the voltage V10 at both ends of the capacitor 10 is increased.

When the voltage V10 of the capacitor 10 is increased and a voltage at each of the inverting input terminals of the hysteresis comparators 113 and 117 reaches a first threshold (which is set to be the same in the hysteresis comparators 113 and 117) that is a threshold at a time when the voltage rises, output signals from the hysteresis comparators 113 and 117 both reach L level, and the first and second switches SW1 and SW2 are turned off. Accordingly, the charging by use of the activation currents from the first and second constant current circuits 101 and 102 to the capacitor 10 is stopped.

Moreover, since the first threshold is set to an activating voltage Vs, the control circuit 8 starts its operations, and the turning on and off of the switching element 6 is started. Thereafter, when the voltage decreases, the hysteresis comparator 117 is operated at a second threshold that is a threshold at a time when the voltage drops, and the hysteresis comparator 113 is operated at a third threshold, which is the threshold at a time when the voltage drops. The second threshold is set to a stop voltage Vu of the control circuit 8 or to a value slightly smaller than the stop voltage. Moreover, the third threshold is set to a value smaller than the second threshold.

In the above state, when the load is increased or short-circuited, the overcurrent detection circuit 25 is operated. Accordingly, the output voltage is lowered, and the voltage of the capacitor 10 is also lowered at the same time. Specifically, as shown in FIG. 8, a period of operations of the DC-DC converter is set to an overcurrent period Toc within an overload period Tod. When the voltage V10 of the capacitor 10 reaches the second threshold, the output signal from the hysteresis comparator 117 is inverted to H level, and the second switch SW2 is turned on. Thereafter, when the voltage rises, the hysteresis comparator 117 is operated at the first threshold. Since the second threshold is set to the stop voltage Vu of the control circuit 8 or to a voltage slightly lower than the stop voltage, the control circuit 8 is stopped. Since consumed current of the control circuit 8 is small when the control circuit 8 is stopped, the charging of the capacitor 10 is started by use of the activation current from the second constant current circuit 102 in the activation circuit 4b. Specifically, the voltage V10 of the capacitor 10 is increased in a reactivation period Trst in the overcurrent state.

When the voltage V10 of the capacitor 10 reaches the first threshold, the output from the hysteresis comparator 117 is inverted and drops to L level, and the second switch SW2 is turned off. Thereafter, when the voltage drops, the hysteresis comparator 117 is operated at the second threshold. Since the first threshold is the activating voltage Vs of the control circuit 8, the control circuit 8 restarts its operations, and the turning on and off of the switching element 6 is started. At this point, when the output is still in the overload state, the overcurrent detection circuit 25 is operated again, and the output voltage and the voltage of the capacitor 10 are lowered. When the voltage V10 of the capacitor 10 reaches the second threshold, the output from the hysteresis comparator 117 is inverted and reaches H level, and the second switch SW2 is turned on. Thereafter, when the voltage rises, the hysteresis comparator 117 is operated at the first threshold. When the voltage V10 of the capacitor 10 reaches the first threshold, the output from the hysteresis comparator 117 is inverted, and the second switch SW2 is turned off. Accordingly, the control circuit 8 restarts its operations, and the turning on and off of the switching element 6 is started.

Repeating the operations described above, the switching element 6 is intermittently turned on and off. The intermittent period is determined by the activation current outputted from the second constant current circuit 102 and the capacity of the capacitor 10. Therefore, the intermittent period can be determined regardless of the activating time period determined by the current, which is obtained by adding the activation current outputted from the first constant current circuit 101 and the activation current outputted from the second constant current circuit 102, and the capacity of the capacitor 10.

In the DC-DC converter according to embodiment 2, the hysteresis comparator 117 functions as the overcurrent detection circuit, and the hysteresis comparators 113 and 117 and the first and second switches SW1 and SW2 function as the activation current switching circuit.

Since the first threshold is set to the activating voltage Vs of the control circuit 8, the initiation of the operations by the control circuit 8 can be detected by the first threshold. The second threshold detects lowering of the output voltage and the voltage of the capacitor 10 due to the operation of the overcurrent protection circuit. Accordingly, the operation of the overcurrent protection circuit can be detected by the second threshold. Timing of sending a signal is when the overcurrent protection circuit is operated, the voltage is lowered, and the operations of the control circuit 8 are stopped. However, since the time the activation current is actually required is when the control circuit 8 is stopped, the same effect is obtained.

Note that, also in a case where a protection circuit other than the overcurrent protection circuit is operated, as in a case where an overvoltage protection circuit shuts off the output when the output voltage is abnormally increased, the voltage of the capacitor 10 is lowered and the hysteresis comparator 113 is operated. In this case, even if the second switch SW2 is turned on and the voltage of the capacitor 10 reaches the first threshold, the control circuit 8 is controlled so as not to operate. Thus, there arises no problem.

Figure 9:
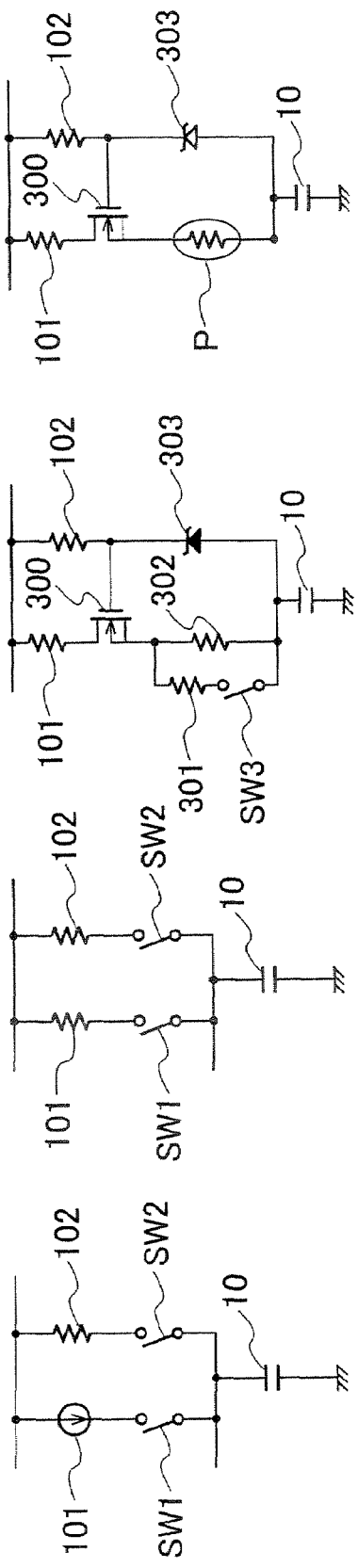
FIGS. 9A to 9D are circuit diagrams showing modified examples of an activation circuit in the DC-DC converter according to embodiment 2 of the present invention.

Note that, in embodiments 1 and 2 described above, the first and second constant current circuits 101 and 102 are used as constant current sources of the activation circuits 4a and 4b. However, as shown in FIG. 9A, a resistor can be used as the second constant current circuit 102. In this case, it is also conceivable that a resistor is used as the first constant current circuit 101. However, since the activation current outputted from the second constant current circuit 102 is smaller than the activation current outputted from the first constant current circuit 101, it is preferable to use the resistor as the second constant current circuit 102 from the viewpoint of power consumption. Moreover, as shown in FIG. 9B, both of the first and second constant current circuits 101 and 102 can also be configured by using resistors.

Moreover, as shown in FIG. 9C, each of the activation circuits 4a and 4b can be comprised of resistors 101, 102, 301 and 302, a MOSFET 300, a Zener diode 303 and a switch SW3. Between the capacitors 3 and 10, a series circuit including the resistor 101, the MOSFET 300 and the resistor 302 is connected, and a series circuit including the resistor 301 and the switch SW3 is connected in parallel with the resistor 302. Moreover, a series circuit including the resistor 102 and the Zener diode 303 is connected between the capacitors 3 and 10, and a connection point between the resistor 102 and the Zener diode 303 is connected to a gate of the MOSFET 300. By use of this activation circuit, the first activation current or the second activation current can be outputted by the switching of the switch SW3.

Furthermore, as shown in FIG. 9D, the activation circuit can be comprised of resistors 101 and 102, a posistor p, a MOSFET 300 and a Zener diode 303. The posistor p is disposed at a position where the posistor is thermally bonded to a heating element, for example, the diode 11. According to this configuration, since the activation current can be switched according to the amount of heat generated by the heating element, the overcurrent detection circuit is no longer required.

Embodiment 3

Figure 10:
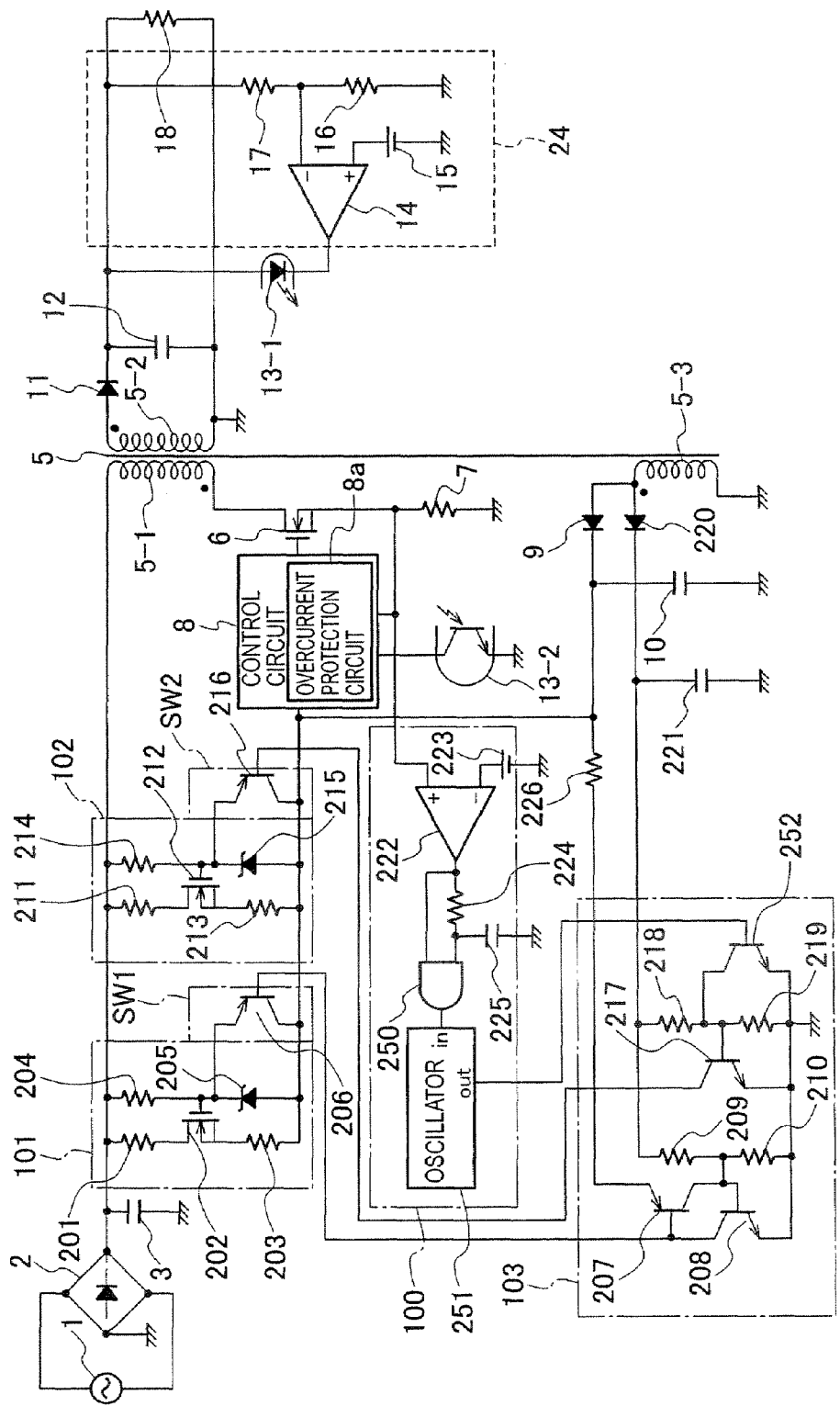
FIG. 10 is a circuit configuration diagram of a DC-DC converter according to embodiment 3 of the present invention.

FIG. 10 is a circuit configuration diagram of a DC-DC converter according to embodiment 3 of the present invention. In the DC-DC converter, a third rectifying and smoothing circuit including a diode 220 and a capacitor 221, which are connected to the tertiary winding 5-3, is added to the DC-DC converter in embodiment 1. The overcurrent detection circuit 100 detects an overcurrent by use of a current flowing through the switching element 6. The activation current switching circuit 103 is configured to generate first and second activation currents by use of a signal from the overcurrent detection circuit 100, a voltage outputted from the second rectifying and smoothing circuit, and a voltage outputted from the third rectifying and smoothing circuit. Moreover, FIG. 10 shows specific circuit examples of the first and second constant current circuits 101 and 102, the first and second switches SW1 and SW2, the activation current switching circuit 103, and the overcurrent detection circuit 100. In the following description, differences from embodiment 1 will be mainly described.

The first constant current circuit 101 includes: a resistor 201, a MOSFET 202 and a resistor 203, which are connected in series between the capacitors 3 and 10; and a resistor 204 and a Zener diode 205, which are connected in series between the capacitors 3 and 10. A connection point between the resistor 204 and the Zener diode 205 is connected to a gate of the MOSFET 202. The first switch SW1 is formed of a PNP transistor 206, in which an emitter is connected to the gate of the MOSFET 202, a collector is connected to the capacitor 10 and a base is connected to the activation current switching circuit 103.

The second constant current circuit 102 includes: a resistor 211, a MOSFET 212 and a resistor 213, which are connected in series between the capacitors 3 and 10; and a resistor 214 and a Zener diode 215, which are connected in series between the capacitors 3 and 10. A connection point between the resistor 214 and the Zener diode 215 is connected to a gate of the MOSFET 212. The second switch SW2 is formed of a PNP transistor 216, in which an emitter is connected to the gate of the MOSFET 212, a collector is connected to the capacitor 10 and a base is connected to the activation current switching circuit 103.

The overcurrent detection circuit 100 includes a comparator 222, a reference power supply 223, a resistor 224, a capacitor 225, an AND circuit 250 and an oscillator 251. A non-inverting input terminal of the comparator 222 is connected to a connection point between the switching element 6 and the resistor 7, and an inverting input terminal thereof is connected to the reference power supply 223. An output terminal of the comparator 222 is connected to one of input terminals of the AND circuit 250 and to the other input terminal of the AND circuit 250 through the resistor 224. The capacitor 225 is disposed between the ground and a connection point between the resistor 224 and the AND circuit 250. An output terminal of the AND circuit 250 is connected to the oscillator 251. The oscillator 251 is formed of a monostable multivibrator which is turned on only for a predetermined period T by a signal from the AND circuit 250 as a trigger, and which outputs pulse signals. Output from the oscillator 251 is sent to the activation current switching circuit 103.

The activation current switching circuit 103 includes a PNP transistor 207, NPN transistors 208, 217 and 252, and resistors 209, 210, 218 and 219.

The resistors 209 and 210 are connected in series between both ends of the capacitor 221. An emitter of the transistor 207 is connected to one end of the capacitor 10 through a resistor 226, a collector thereof is connected to a connection point between the resistors 209 and 210 and to a base of the transistor 208, and a base thereof is connected to a collector of the transistor 208 and to the base of the transistor 206. The collector of the transistor 208 is connected to the base of the transistor 206 and to the base of the transistor 207, an emitter thereof is grounded, and the base thereof is connected to the connection point between the resistors 209 and 210 and to the collector of the transistor 207.

The resistors 218 and 219 are connected in series between the both ends of the capacitor 221. A collector of the transistor 217 is connected to the base of the transistor 216, an emitter thereof is grounded, and a base thereof is connected to a connection point between the resistors 218 and 219 and to a collector of the transistor 252. The collector of the transistor 252 is connected to the connection point between the resistors 218 and 219 and to the base of the transistor 217, an emitter thereof is grounded, and a base thereof is connected to an output terminal of the oscillator 251.

Next, with reference to a waveform diagram shown in FIG. 11, description will be given of operations of the DC-DC converter thus configured according to embodiment 3 of the present invention.

First, operations at the time of activation will be described. As shown in FIG. 11, in an activating period Tst of the control circuit 8, a voltage obtained by rectifying the output from the AC power supply 1 by use of the full-wave rectifier 2 is applied to the capacitor 3. Accordingly, the capacitor 3 is charged, and a DC input voltage that is a voltage V3 of the capacitor 3 reaches a predetermined value. In this event, since the transistors 206, 207 and 208 are off, an activation current I1 determined by the Zener diode 205, a gate voltage of the MOSFET 202 and the resistor 203 is outputted from the first constant current circuit 101 as shown in FIG. 11. Thus, the capacitor 10 is charged.

Figure 11:
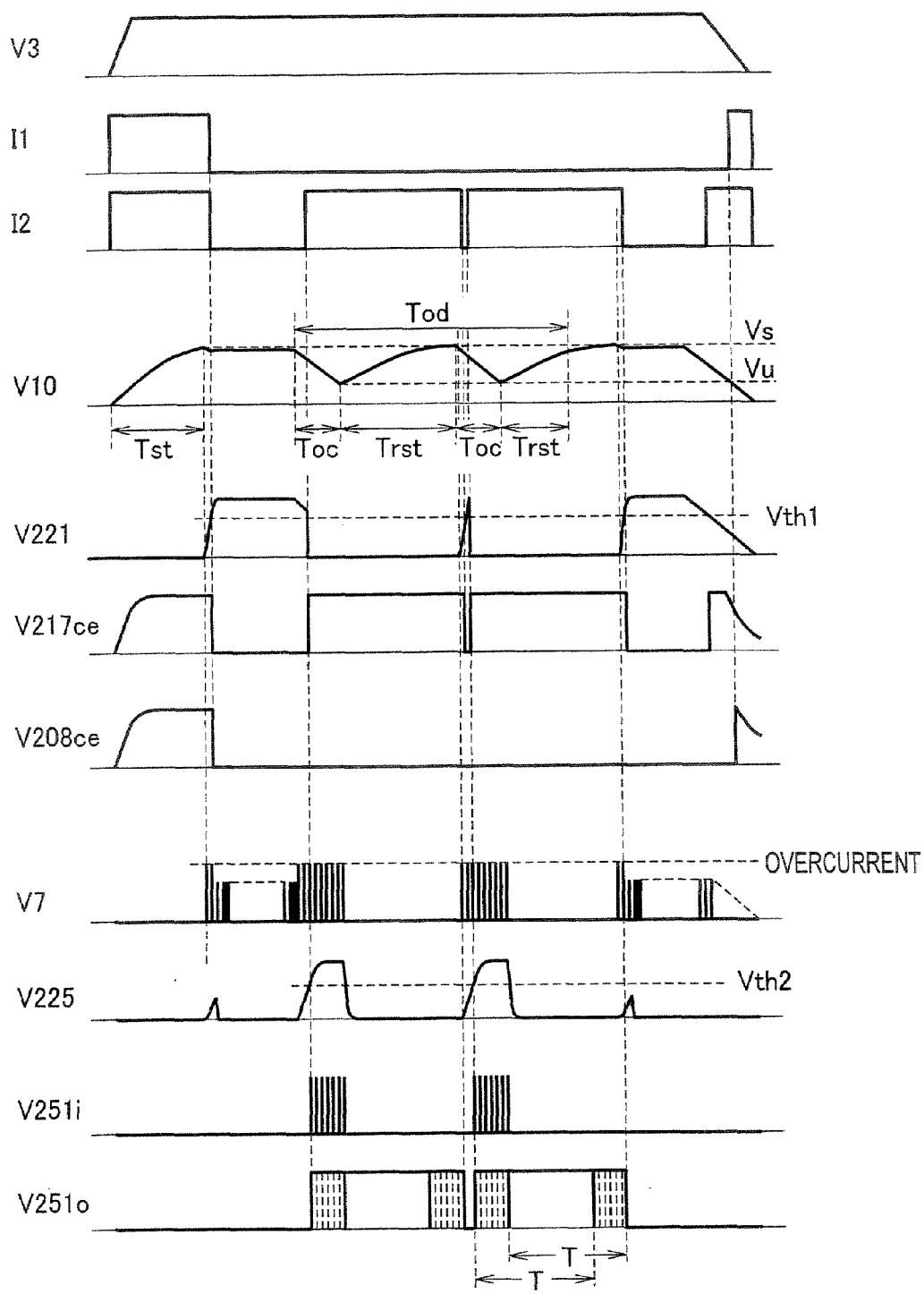
FIG. 11 is a waveform diagram showing operations of the DC-DC converter according to embodiment 3 of the present invention.

Similarly, since the transistors 216, 217 and 252 are also off, an activation current I2 determined by the Zener diode 215, a gate voltage of the MOSFET 212 and the resistor 213 is outputted from the second constant current circuit 102 as shown in FIG. 11. Accordingly, the capacitor 10 is charged. In this case, the sum of the current I1 from the first constant current circuit 101 and the current I2 from the second constant current circuit 102 is set to be a first activation current. Accordingly, as shown in FIG. 11, the capacitor 10 is gradually charged, and a voltage V10 at both ends of the capacitor 10 is increased.

When the voltage of the capacitor 10 reaches an activating voltage Vs of the control circuit 8, the control circuit 8 starts its operations and the turning on and off of the switching element 6 is started. When the turning on and off of the switching element 6 is started, an output voltage rises and the capacitors 10 and 221 are charged by the tertiary winding 5-3 of the transformer 5. As shown in FIG. 11, the capacitor 221 is charged by the initiation of the turning on and off of the switching element 6. Accordingly, the initiation of the turning on and off of the switching element 6 is detected by monitoring a voltage V221 of the capacitor 221.

When a voltage obtained by dividing the voltage V221 of the capacitor 221 by the resistors 209 and 210 reaches a predetermined voltage Vth1 (when a voltage of the resistor 210 reaches a base-emitter voltage of the transistor 208), the transistors 208 and 207 are turned on. Accordingly, as shown in FIG. 11, a collector-emitter voltage Vce of the transistor 208 comes to 0. The transistor 207 supplies a base current of the transistor 208 through the resistor 226 from the capacitor 10. Thus, even when the voltage V221 of the capacitor 221 is lowered, a base voltage of the transistor 208 is not lowered, and the ON state is continued.

When the transistors 207 and 208 are turned on, the transistor 206 is turned on and the MOSFET 202 is turned off. Therefore, as shown in FIG. 11, the activation current I1 outputted from the first constant current circuit 101 is blocked. Similarly, when the voltage V221 of the capacitor 221, which is divided by the resistors 218 and 219, reaches the predetermined voltage Vth1, the transistors 217 and 216 are turned on. Accordingly, as shown in FIG. 11, a collector-emitter voltage Vce of the transistor 217 is set to 0, and the MOSFET 212 is turned off. Therefore, as shown in FIG. 11, the activation current I2 outputted from the second constant current circuit 102 is blocked. As described above, both of the activation current I1 outputted from the first constant current circuit 101 and the activation current I2 outputted from the second constant current circuit 102 are blocked. The control circuit 8 continues its operations by use of the capacitor 10 charged by the voltage of the tertiary winding 5-3 of the transformer 5.

Next, operations when overloaded will be described. Specifically, as shown in FIG. 11, a period of operations of the DC-DC converter is set to an overcurrent period Toc within an overload period Tod. In this event, since the current flowing into the switching element 6 is increased, a voltage drop in the resistor 7 is increased. As shown in FIG. 11, when a voltage V7 at the connection point between the switching element 6 and the resistor 7 reaches a voltage at which the overcurrent protection circuit 8a included in the control circuit 8 is operated, the comparator 222 outputs a pulse signal as a result of comparison between the above voltage and a reference voltage outputted from the reference power supply 223. When the pulse signals are continuously outputted, as shown in FIG. 11, a voltage V225 of the capacitor 225, which forms an integration circuit, is increased. Moreover, when the voltage V225 of the capacitor 225 reaches a threshold Vth2 of the AND circuit 250, the AND circuit 250 passes signals outputted from the comparator 222.

Upon receipt of a pulse signal V251i as shown in FIG. 11, which is outputted from the AND circuit 250, the oscillator 251 generates and outputs a one-shot pulse V251o during a predetermined period T as shown in FIG. 11. When the next signal is inputted before the pulse ends, the pulse is generated for the period T from that point. Accordingly, when signals are inputted in a period shorter than the period T, the pulses are continuously outputted. When the pulse described above is supplied to the base of the transistor 252, the transistor 252 is turned on and the transistor 217 is turned off. As a result, the transistor 216 is turned off, the MOSFET 212 is turned on, and the activation current I2 is outputted from the second constant current circuit 102. The activation current I2 outputted from the second constant current circuit 102 is set smaller than consumed current of the control circuit 8. At this point, since the control circuit 8 is operated, the capacitor 10 is not charged by the activation current I2 outputted from the second constant current circuit 102.

When the overcurrent protection circuit 8a is operated, the output voltage is lowered. Accordingly, as shown in FIG. 11, the voltage V10 of the capacitor 10 is also lowered. When the state where the impedance of the load 18 is small, as in a case of short-circuiting and the like, continues for a long time, the voltage V10 of the capacitor 10 is lowered to the stop voltage Vu of the control circuit 8. Accordingly, the turning on and off of the switching element 6 is stopped. As a result, the consumed current of the control circuit 8 is reduced almost to 0, and, as shown in FIG. 11, the capacitor 10 is charged by the activation current I2 outputted from the second constant current circuit 102. The period T of the pulse outputted from the oscillator 251 is set to not less than a period Trst until the voltage V10 of the capacitor 10 reaches the activating voltage Vs of the control circuit 8 by getting charged with the activation current I2 outputted from the second constant current circuit 102. The voltage V10 of the capacitor 10 reaches the activating voltage Vs of the control circuit 8, and the activation current I2 is outputted from the second constant current circuit 102 until the turning on and off of the switching element 6 is started.

In a case where the load is still in the overcurrent state even after the turning on and off of the switching element 6 is started, the pulse signal is generated again from the comparator 222. Moreover, by the operations described above, the operations such as the operating and the stopping of the control circuit 8, the charging the capacitor 10 with the activation current I2 from the second constant current circuit 102 and the activating the control circuit 8 are repeated. When the load is no longer in the overcurrent state, the output voltage rises, and the capacitors 10 and 221 are charged by the tertiary winding 5-3. When the voltage V221 of the capacitor 221 reaches a predetermined voltage, the transistor 217 is turned on and output of the activation current I2 from the second constant current circuit 102 is stopped.

Embodiment 4

Figure 12:
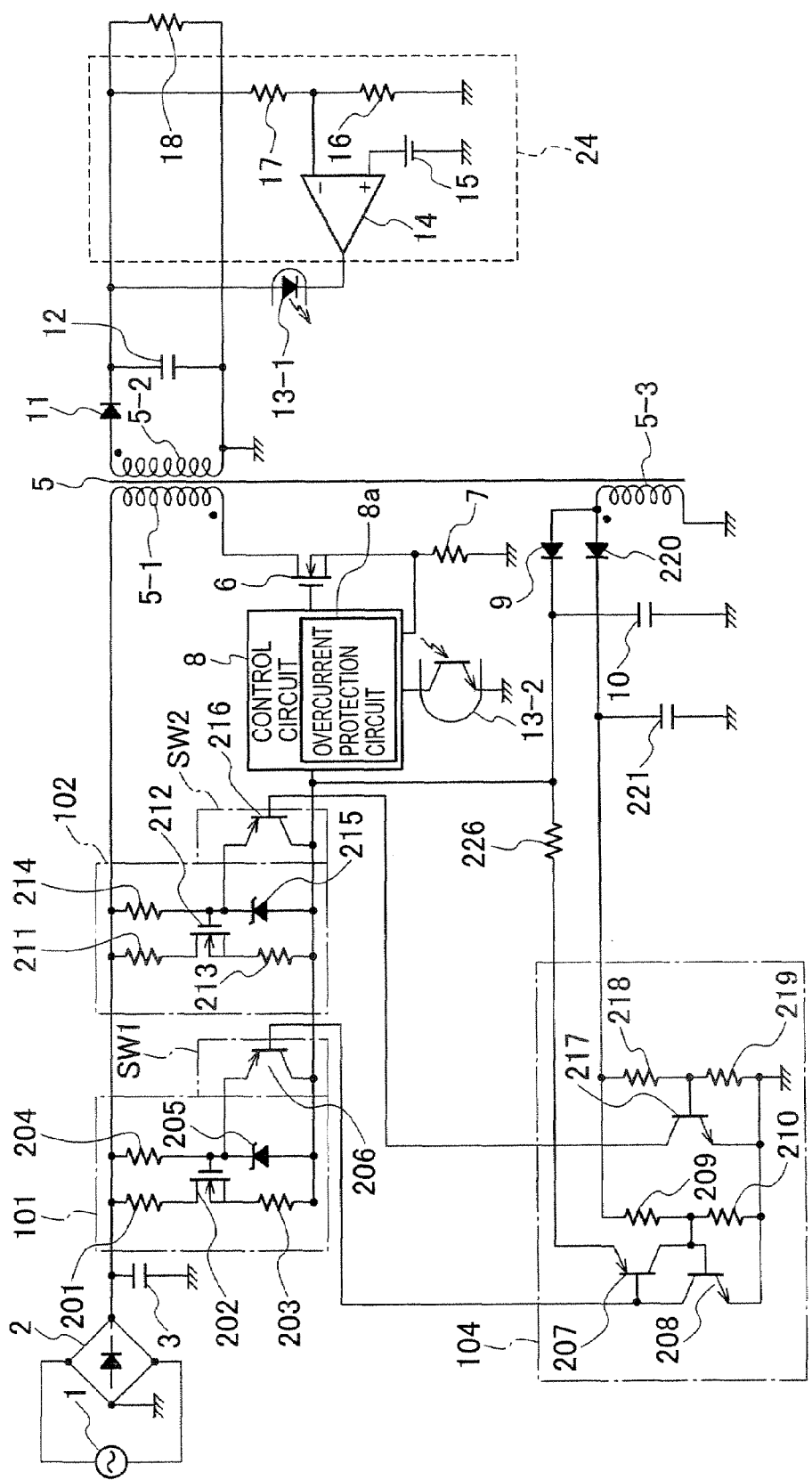
FIG. 12 is a circuit configuration diagram of a DC-DC converter according to embodiment 4 of the present invention.

FIG. 12 is a circuit configuration diagram of a DC-DC converter according to embodiment 4 of the present invention. The DC-DC converter includes an activation current control circuit 104 formed by integrating the overcurrent detection circuit 100 and the activation current switching circuit 103 in the DC-DC converter of embodiment 3. In the following description, differences from embodiment 3 will be mainly described.

The activation current control circuit 104 includes a PNP transistor 207, NPN transistors 208 and 217, and resistors 209, 210, 218 and 219.

The resistors 209 and 210 are connected in series between both ends of the capacitor 221. An emitter of the transistor 207 is connected to one end of the capacitor 10 through a resistor 226, and a collector thereof is connected to a connection point between the resistors 209 and 210 and to a base of the transistor 208. A base of the transistor 207 is connected to a collector of the transistor 208 and to the base of the transistor 206. The collector of the transistor 208 is connected to the base of the transistor 206 and to the base of the transistor 207, an emitter thereof is grounded, and the base thereof is connected to the connection point between the resistors 209 and 210 and the base of the transistor 207.

The resistors 218 and 219 are connected in series between the both ends of the capacitor 221. A collector of the transistor 217 is connected to the base of the transistor 216, an emitter thereof is grounded, and a base thereof is connected to a connection point between the resistors 218 and 219.

Next, with reference to a waveform diagram shown in FIG. 13, description will be given of operations of the DC-DC converter thus configured according to embodiment 4 of the present invention. Note that, since operations at the time of activation are the same as those of the DC-DC converter according to embodiment 3 described above, description thereon will be omitted.

The operations when overloaded will be described below. The voltage is generated in the tertiary winding 5-3 only when the switching element 6 is being turned on and off. The voltage V221 of the capacitor 221 is charged only with the voltage generated in the tertiary winding 5-3. Therefore, by monitoring the voltage V221 of the capacitor 221, it can be detected that the overcurrent protection circuit 8a is operated and that the turning on and off of the switching element 6 is stopped.

Figure 13:
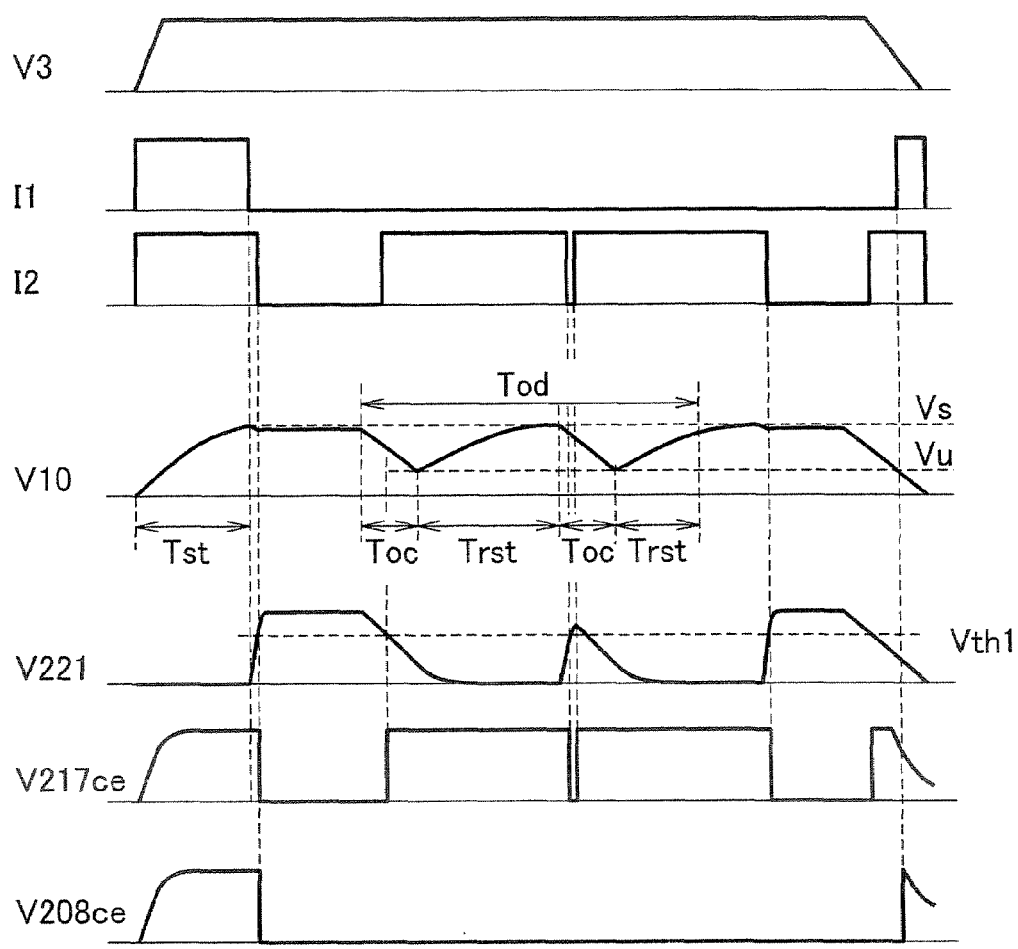
FIG. 13 is a waveform diagram showing operations of the DC-DC converter according to embodiment 4 of the present invention.

As shown in FIG. 13, when a period of operations of the DC-DC converter is set to an overcurrent period Toc within an overload period Tod, the output voltage is lowered, and the voltage V10 of the capacitor 10 and the voltage V221 of the capacitor 221 are lowered in accordance. When the voltage V10 of the capacitor 10 reaches the stop voltage Vu, and when a voltage obtained by dividing the voltage V221 of the capacitor 221 by the resistors 218 and 219 is reduced below a base-emitter voltage of the transistor 217, the transistors 217 and 216 are turned off.

As a result, the MOSFET 212 is turned on, and, as shown in FIG. 13, the activation current I2 is outputted from the second constant current circuit 102. Thereafter, when the voltage V10 of the capacitor 10 reaches the activating voltage Vs of the control circuit 8, the control circuit 8 starts its operations, and the turning on and off of the switching element 6 is started. As a result, the voltage V221 of the capacitor 221 is increased, and the transistors 217 and 216 are turned on. Accordingly, the MOSFET 212 is turned off, and output of the activation current I2 from the second constant current circuit 102 is stopped.

In the DC-DC converter according to embodiment 4, the operation of the overcurrent detection circuit is detected by the status that the turning on and off of the switching element 6 is stopped by the operation of the overcurrent protection circuit 8a (that the turning on and off of the switching element 6 is stopped by the presence or absence of voltage generated in the tertiary winding 5-3 of the transformer 5). The turning on and off of the switching element 6 is stopped not only when the overcurrent protection function is executed. However, the turning on and off of the switching element 6 is stopped, and the activation current outputted from the second constant current circuit 102 is small. Thus, the flow of the above activation current causes no problem, and the DC-DC converter can be realized with a simple circuit configuration.

Note that the circuit including the transistors 207 and 208 and the resistors 209 and 210 can also take a form of a circuit which detects the voltage of the capacitor 10 by use of hysteresis comparators as in the case of embodiment 2.

Embodiment 5

Figure 14:
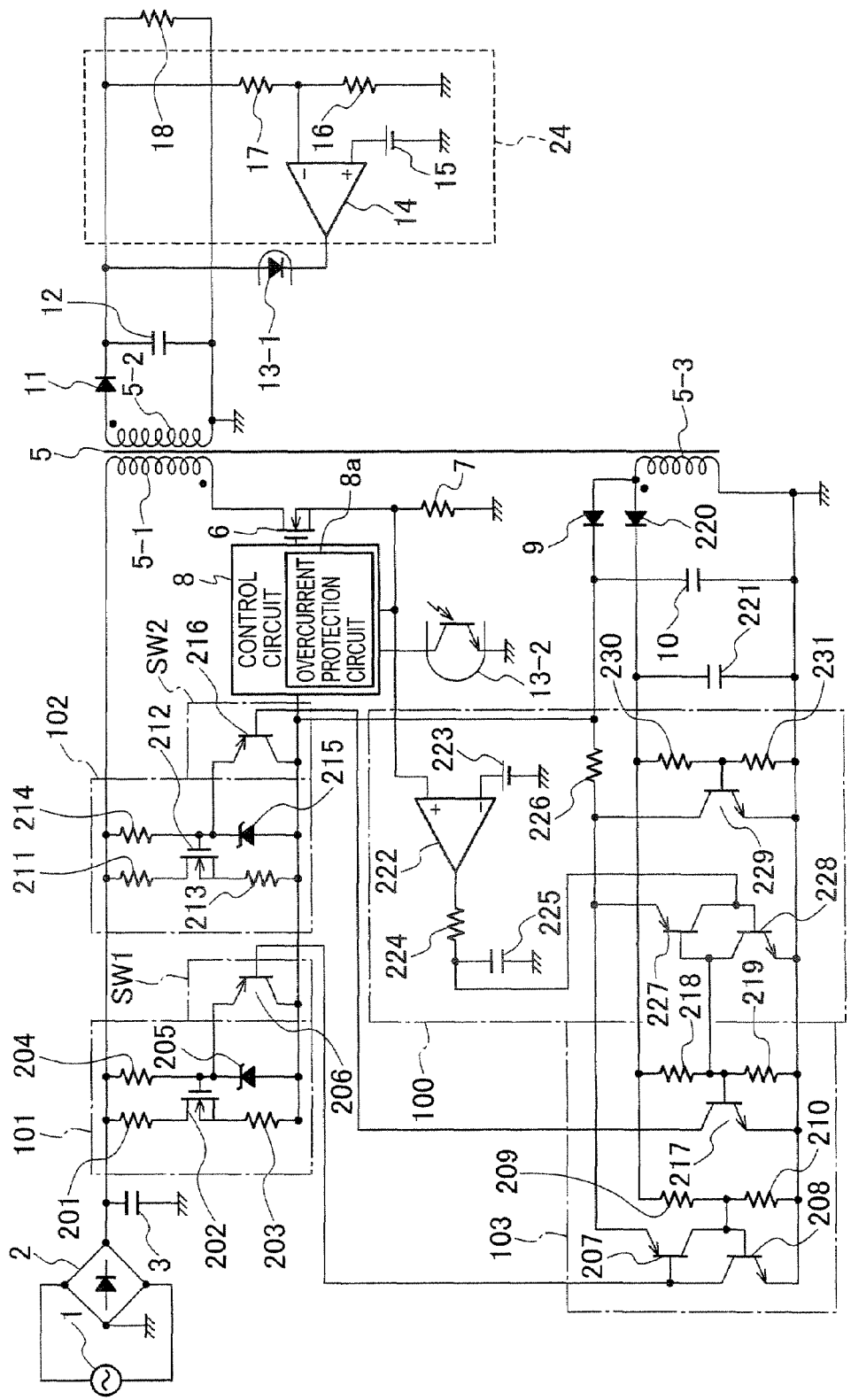
FIG. 14 is a circuit configuration diagram of a DC-DC converter according to embodiment 5 of the present invention.

FIG. 14 is a circuit configuration diagram of a DC-DC converter according to embodiment 5 of the present invention. In the DC-DC converter, the respective configurations of the overcurrent detection circuit 100 and the activation current switching circuit 103 in the DC-DC converter of embodiment 3 are changed. In the following description, differences from embodiment 3 will be mainly described.

The overcurrent detection circuit 100 includes a comparator 222, a reference power supply 223, a resistor 224, a capacitor 225, a PNP transistor 227, NPN transistors 228 and 229, and resistors 230 and 231. A non-inverting input terminal of the comparator 222 is connected to a connection point between the switching element 6 and the resistor 7, and an inverting input terminal thereof is connected to the reference power supply 223. An output terminal of the comparator 222 is connected to a base of the transistor 228 and to a collector of the transistor 227 through the resistor 224. The capacitor 225 is disposed between the ground and a connection point between the resistor 224 and the base of the transistor 228.

An emitter of the transistor 227 is connected to one end of the capacitor 10 through a resistor 226, the collector thereof is connected to the base of the transistor 228 and to the resistor 224, and a base thereof is connected to a collector of the transistor 228 and to the activation current switching circuit 103. The collector of the transistor 228 is connected to the base of the transistor 227 and to the activation current switching circuit 103, an emitter thereof is grounded, and the base thereof is connected to the collector of the transistor 227 and to the resistor 224. The resistors 230 and 231 are connected in series between the both ends of the capacitor 221. A collector of the transistor 229 is connected to one end of the capacitor 10 through the resistor 226, an emitter thereof is grounded, and a base thereof is connected to a connection point between the resistors 230 and 231.

The activation current switching circuit 103 includes a PNP transistor 207, NPN transistors 208 and 217, and resistors 209, 210, 218 and 219.

The resistors 209 and 210 are connected in series between both ends of the capacitor 221. An emitter of the transistor 207 is connected to one end of the capacitor 10 through a resistor 226, a collector thereof is connected to a connection point between the resistors 209 and 210 and to a base of the transistor 208, and a base thereof is connected to a collector of the transistor 208 and to the base of the transistor 206. The collector of the transistor 208 is connected to the base of the transistor 206 and to the base of the transistor 207, an emitter thereof is grounded, and the base thereof is connected to the connection point between the resistors 209 and 210 and to the collector of the transistor 207.

The resistors 218 and 219 are connected in series between the both ends of the capacitor 221. A collector of the transistor 217 is connected to the base of the transistor 216, an emitter thereof is grounded, and a base thereof is connected to a connection point between the resistors 218 and 219, to the collector of the transistor 228 in the overcurrent detection circuit 100, and to the base of the transistor 227.

Next, with reference to a waveform diagram shown in FIG. 15, description will be given of operations of the DC-DC converter thus configured according to embodiment 5 of the present invention. Note that, since operations at the time of activation are the same as those of the DC-DC converter according to embodiment 3 described above, description thereon will be omitted.

Figure 15:
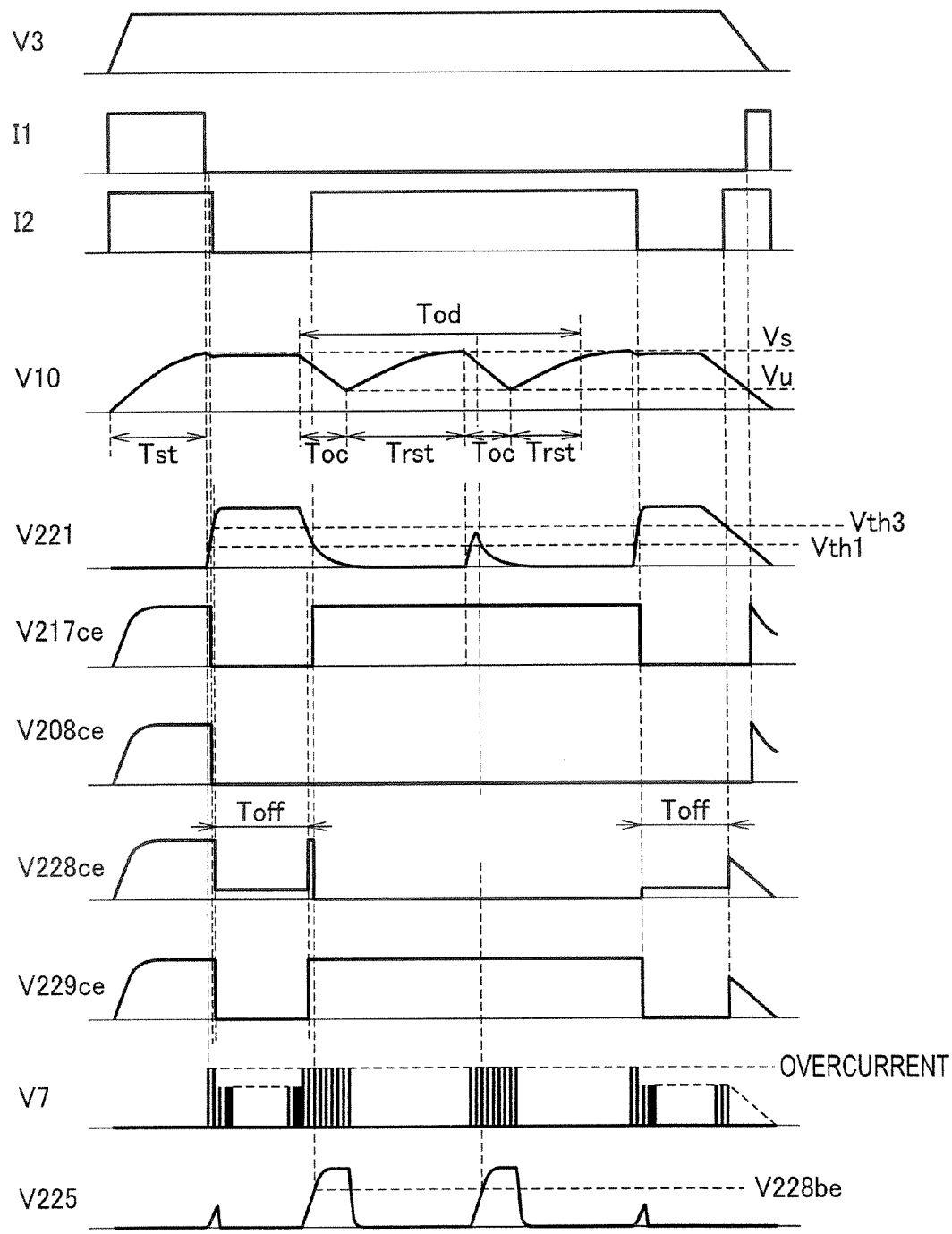
FIG. 15 is a waveform diagram showing operations of the DC-DC converter according to embodiment 5 of the present invention.

As shown in FIG. 15, a period of operations of the DC-DC converter is set to an overcurrent period Toc within an overload period Tod. In this event, since the current flowing into the switching element 6 is increased, a voltage drop in the resistor 7 is increased. As shown in FIG. 15, when a voltage V7 at the connection point between the switching element 6 and the resistor 7 reaches a voltage at which the overcurrent protection circuit 8a included in the control circuit 8 is operated, the comparator 222 outputs a pulse signal as a result of comparison between the above voltage and a reference voltage outputted from the reference power supply 223. When the pulse signals are continuously outputted, a voltage V225 of the capacitor 225 forming an integration circuit is increased as shown in FIG. 15. Moreover, when the voltage V225 of the capacitor 225 is increased to not less than a base-emitter voltage V228$be$ of the transistor 228, the transistors 228 and 227 are turned on. Thus, a collector-emitter voltage V228$ce$ of the transistor 228 comes to 0.

Since the transistor 227 supplies a base current of the transistor 228, the transistor 228 continues the ON state even when there is no voltage left in the capacitor 225. When the transistor 228 is turned on, the transistors 217 and 216 are turned off. Accordingly, the MOSFET 212 is turned on, and the activation current I2 is outputted from the second constant current circuit 102.

When the overload state is resolved, the voltage V221 of the capacitor 221 is increased, a voltage Vth3 divided by the resistors 230 and 231 is increased, and the transistor 229 is turned on. Accordingly, a collector-emitter voltage V229$ce$ of the transistor 229 comes to 0. As a result, the transistors 227 and 228 are turned off, and the transistor 217 is turned on. Although the transistor 228 is turned off in a period Toff, no voltage is applied. Accordingly, the transistor 216 is turned on, the MOSFET 212 is turned off, and the activation current I2 outputted from the second constant current circuit 102 is blocked. In this configuration, when the load is set in the overload state, and then the overload state is resolved before the voltage V10 of the capacitor 10 is lowered to the stop voltage Vu of the control circuit 8, the activation current I2 outputted from the second constant current circuit 102 is also blocked.

The DC-DC converter according to the present invention can be utilized for a power supply device which requires an overcurrent protection function.

What is claimed is:

1. A DC-DC converter comprising:
a switching element connected to a DC power supply through a primary winding of a transformer;
a control circuit which controls a turning on and off of the switching element;
an activation circuit which activates the control circuit by supplying a power supply voltage to the control circuit;
a first rectifying and smoothing circuit which supplies a first output voltage to a load, the first output voltage being obtained by rectifying and smoothing a voltage generated in a secondary winding of the transformer;
a second rectifying and smoothing circuit which supplies a second output voltage, as a power supply, to the control circuit, the second output voltage being obtained by rectifying and smoothing a voltage generated in a tertiary winding of the transformer;
an overcurrent protection circuit which limits an output current to be supplied to the load when overloaded;
an overcurrent detection circuit which detects that the load is in an overcurrent state, and which outputs a detection signal during a period, when the overcurrent protection circuit is operated; and an activation current switching circuit which switches outputs from the activation circuit so as to output a first activation current generated from the DC power supply at a time when the control circuit is activated, and so as to output a second activation current, which is smaller than the first activation current, during a period when the detection signal is outputted from the overcurrent detection circuit after the control circuit is activated, wherein the control circuit controls the output current when overloaded, by intermittently turning on and off the switching element in a case where the second output voltage from the second rectifying and smoothing circuit is lowered by an operation of the overcurrent protection circuit, and the activation circuit supplies a voltage, as the power supply voltage, to the control circuit, the voltage being obtained by getting the activation circuit charged with any of the first and second activation currents, which are switched by the activation current switching circuit.

2. The DC-DC converter according to claim 1, wherein the overcurrent detection circuit outputs the detection signal when it is detected that a voltage between both ends of a capacitor included in the second rectifying and smoothing circuit comes to not more than a predetermined voltage, and stops output of the detection signal when it is detected that the power supply voltage of the control circuit comes to an activating voltage , that is a voltage at which the control circuit can be operated.

3. The DC-DC converter according to claim 2, wherein the activation circuit generates and outputs the first and second activation currents by using any of a constant current circuit, a resistor, and a combination of the constant current circuit and the resistor.

4. The DC-DC converter according to claim 1, wherein the activation circuit generates and outputs the first and second activation currents by using any of a constant current circuit, a resistor, and a combination of the constant current circuit and the resistor.

* * * * *